(12) United States Patent
Lev

(10) Patent No.: US 11,881,033 B2
(45) Date of Patent: Jan. 23, 2024

(54) RELIABLE VISUAL MARKERS BASED ON MULTISPECTRAL CHARACTERISTICS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 441 days.

(21) Appl. No.: 17/313,161

(22) Filed: May 6, 2021

(65) Prior Publication Data

US 2022/0284224 A1 Sep. 8, 2022

Related U.S. Application Data

(63) Continuation-in-part of application No. 17/191,793, filed on Mar. 4, 2021.

(51) Int. Cl.
  *G06V 20/56* (2022.01)
  *E01F 9/506* (2016.01)
  *E01C 23/20* (2006.01)
  *G01J 3/28* (2006.01)
  *G01J 3/42* (2006.01)
  (Continued)

(52) U.S. Cl.
  CPC ............ *G06V 20/588* (2022.01); *E01C 23/20* (2013.01); *E01F 9/506* (2016.02); *G01J 3/2823* (2013.01); *G01J 3/42* (2013.01); *G05D 1/0242* (2013.01); *G06F 18/23* (2023.01); *G06V 10/143* (2022.01);
  (Continued)

(58) Field of Classification Search
  CPC ........... G06T 7/13; G06T 7/60; G06V 40/103; G06V 20/56; B60T 8/12; B60G 2401/16
  See application file for complete search history.

(56) References Cited

U.S. PATENT DOCUMENTS 6,922,636 B2 * 7/2005 Balasubramanian ........................ B60R 16/0237 702/5
9,230,183 B2 * 1/2016 Bechtel ..................... B60R 1/04
(Continued)

OTHER PUBLICATIONS

Babic et al. "Application and Characteristics of Waterborne Road Marking Paint", International Journal or Traffic and Transport Engineering, 5(2): 150-169, Jun. 1, 2015.
(Continued)

*Primary Examiner* — Yosef Kassa

(57) ABSTRACT

Disclosed herein are methods and systems for painting driving assistance markings using one or more paint materials which are visible in a plurality of light spectral ranges, in particular, visible light and one or more infrared light spectral ranges. Further disclosed are methods and systems for analyzing images captured in multiple spectral ranges to identify the driving assistance markings and/or part thereof in a plurality of different spectral ranges and identify aggregated driving assistance markings by aggregating the driving assistance markings identified in the plurality of different spectral ranges. Also disclosed herein are methods and systems for presenting and detecting enhanced driving assistance markings on one or more elements under one or more paint materials which are highly transparent in one or more infrared spectral ranges while reflecting visible light conforming to a color of the element(s) surface thus not affecting appearance of the element(s) in the visible light spectrum.

14 Claims, 14 Drawing Sheets

(51) Int. Cl.
*G05D 1/02* (2020.01)
*G06V 10/44* (2022.01)
*G06V 10/143* (2022.01)
*G06F 18/23* (2023.01)

(52) U.S. Cl.
CPC ..... *G06V 10/44* (2022.01); *G05D 2201/0213* (2013.01)

(56) References Cited

U.S. PATENT DOCUMENTS

| | | | |
|---|---|---|---|
| 9,721,460 B2* | 8/2017 | Takemura | G08B 29/185 |
| 10,147,320 B1* | 12/2018 | Ellis | G01S 17/931 |
| 10,309,788 B2* | 6/2019 | Davidson | G01C 21/3852 |
| 10,635,896 B2* | 4/2020 | Heimberger | G06T 7/73 |
| 2022/0282436 A1 | 9/2022 | Lev | |
| 2022/0284223 A1 | 9/2022 | Lev | |
| 2022/0284225 A1 | 9/2022 | Lev | |
| 2022/0284226 A1 | 9/2022 | Lev | |

OTHER PUBLICATIONS

Smith "Refelective Road Markings Improve Visibility, Safety", Road Markings, Barriers & Workzone Protection, 4 P., Feb. 13, 2012.

* cited by examiner

VISIBLE LIGHT

NIR 850

SEGMENTATION

SEGMENTATION

RELIABLE VISUAL MARKERS BASED ON MULTISPECTRAL CHARACTERISTICS

RELATED APPLICATION(S)

This application is a Continuation-in-Part (CIP) of U.S. patent application Ser. No. 17/191,793 filed on Mar. 4, 2021, the contents of which are all incorporated by reference as if fully set forth herein in their entirety.

FIELD AND BACKGROUND OF THE INVENTION

The present invention, in some embodiments thereof, relates to painting driving assistance markings to support automated vehicular systems, and, more specifically, but not exclusively, to painting driving assistance markings which are visible in the infrared spectrum while imperceptible in the human visible light spectrum to support automated vehicular systems.

Road markings have evolved over the years since the introduction of motorized vehicles and the development of roads infrastructures to host these vehicles in order to assist drivers to grasp and understand their motorized environment and take actions accordingly.

Recent times have witnessed major advancement, evolution and in fact revolution in the development and deployment of automated vehicular systems which were initially designed to assist the human drivers and are now aiming to make the vehicles at least partially autonomous and eventually fully autonomous.

Such automated vehicular systems may also rely at least partially on the road markings for their operation, for example, monitor lanes, detect road objects (margins, pedestrian crossings, sidewalks, traffic lights, etc.), control operation of the vehicles (e.g. slow down and/or break in front of traffic circle, maneuver to maintain lane, take turns, etc.) and/or the like.

SUMMARY OF THE INVENTION

According to a first aspect of the present invention there is provided a method of painting driving markings invisible in visible light spectrum, comprising using one or more processors for:
Generating driving assistance markings expressing driving information relating to one or more road segments.
Computing instructions for painting the driving assistance markings on one or more elements of the one or more road segments using one or more paint materials characterized by:
  (1) Reflecting light in a visible light spectral range deviating less than a first value from the visible light spectral range reflected by a surface of the one or more elements.
  (2) Reflecting light in an infrared spectral range deviating more than a second value from the infrared spectral range reflected by the surface of the one or more elements.
Outputting the painting instructions for applying the one or more paint materials on the one or more elements of the one or more road segments according to the instructions such that the driving assistance markings are visible in the infrared spectrum and significantly invisible in the visible spectrum.

According to a second aspect of the present invention there is provided a system for painting driving markings invisible in visible light spectrum, comprising one or more processors configured to execute a code. The code comprising:
Code instructions to generate driving assistance markings expressing driving information relating to one or more road segments.
Code instructions to compute instructions for painting the driving assistance markings on one or more elements of the one or more road segments using one or more paint materials characterized by:
  (1) Reflecting light in a visible light spectral range deviating less than a first value from the visible light spectral range reflected by a surface of the one or more elements.
  (2) Reflecting light in an infrared spectral range deviating more than a second value from the infrared spectral range reflected by the surface of the one or more elements.
Code instructions to output the painting instructions for applying the one or more paint materials on the one or more elements of the one or more road segments according to the instructions such that the driving assistance markings are visible in the infrared spectrum and significantly invisible in the visible spectrum.

According to a third aspect of the present invention there is provided a method of painting automatically driving markings invisible in visible light spectrum, comprising using one or more processors for:
Generating driving assistance markings expressing driving information relating to one or more road segments.
Analyzing one or more images of the one or more road segments to identify a visible light spectral range reflected by one or more surfaces of one or more elements of the one or more road segments.
Selecting one or more paint materials characterized by:
  (1) Reflecting light in a visible light spectral range deviating less than a first value from the visible light spectral range reflected by the surface of the one or more elements.
  (2) Reflecting light in an infrared spectral range deviating more than a second value from the infrared spectral range reflected by the surface of the one or more elements.
Painting the driving assistance markings by applying the one or more selected paint materials on the one or more elements of the one or more road segments such that the driving assistance markings are visible in the infrared spectrum and significantly invisible in the visible spectrum.

According to a fourth aspect of the present invention there is provided a system for painting automatically driving markings invisible in visible light spectrum, comprising one or more processors configured to execute a code. The code comprising:
Code instructions to generate driving assistance markings expressing driving information relating to one or more road segments.
Code instructions to analyze one or more images of the one or more road segments to identify a visible light spectral range reflected by one or more surfaces of one or more elements of the one or more road segments.
Code instructions to select one or more paint materials characterized by:
  (1) Reflecting light in a visible light spectral range deviating less than a first value from the visible light spectral range reflected by the surface of the one or more elements (2) Reflecting light in an infrared spectral range deviating more than a second value from the infrared spectral range reflected by the surface of the one or more elements.

Code instructions to paint the driving assistance markings by applying the one or more selected paint materials on the one or more elements of the one or more road segments such that the driving assistance markings are visible in the infrared spectrum and significantly invisible in the visible spectrum.

According to a fifth aspect of the present invention there is provided a method of detecting driving markings visible in a plurality of light spectrums, comprising using one or more processors deployed in a vehicle for:

Receiving a plurality of a plurality of images captured in a plurality of spectral ranges. The plurality of images depicting at least part of driving assistance markings painted on a surface of one or more elements of one or more road segments with one or more paint materials characterized by reflecting light deviating, in the plurality of spectral ranges, by more than a certain value from the light reflected by the surface.

Analyzing one or more first images of the plurality of images captured in a first spectral range of the plurality of spectral ranges to identify at least part of the driving assistance markings in the first spectral range.

Analyzing one or more second images of the plurality of images captured in one or more second spectral ranges of the plurality of spectral ranges to identify at least part of the driving assistance markings in the one or more second spectral ranges.

Identifying aggregated driving assistance markings by correlating between the at least part of the driving assistance markings identified in the first spectral range and the at least part of the driving assistance markings identified one or more second spectral ranges.

Outputting the aggregated driving assistance markings.

According to a sixth aspect of the present invention there is provided a system for detecting driving markings visible in a plurality of light spectrums, comprising one or more processors deployed in a vehicle configured to execute a cod. The code comprising:

Code instructions to receive a plurality of a plurality of images captured in a plurality of spectral ranges. The plurality of images depicting at least part of driving assistance markings painted on a surface of one or more elements of one or more road segments with one or more paint materials characterized by reflecting light deviating, in the plurality of spectral ranges, by more than a certain value from the light reflected by the surface.

Code instructions to analyze one or more first images of the plurality of images captured in a first spectral range of the plurality of spectral ranges to identify at least part of the driving assistance markings in the first spectral range.

Code instructions to analyze one or more second images of the plurality of images captured in one or more second spectral ranges of the plurality of spectral ranges to identify at least part of the driving assistance markings in the one or more second spectral ranges.

Code instructions to identify aggregated driving assistance markings by correlating between the at least part of the driving assistance markings identified in the first spectral range and the at least part of the driving assistance markings identified one or more second spectral ranges.

Code instructions to output the aggregated driving assistance markings.

According to a seventh aspect of the present invention there is provided a method of painting driving markings visible in a plurality of light spectrums, comprising using one or more processors for:

Generating driving assistance markings expressing driving information relating to one or more road segments.

Computing instructions for painting the driving assistance markings on one or more elements of the one or more road segments using one or more paint materials characterized by reflecting light deviating, in a plurality of spectral ranges, by more than a certain value from the light reflected by a surface of the one or more elements.

Outputting the painting instructions for applying the one or more paint materials on the one or more elements of the one or more road segments such that the driving assistance markings are visible in the plurality of spectral ranges.

According to an eighth aspect of the present invention there is provided a system for painting driving markings visible in a plurality of light spectrums, comprising one or more processor configured to execute a code, the code comprising:

Code instructions to generate driving assistance markings expressing driving information relating to one or more road segments.

Code instructions to compute instructions for painting the driving assistance markings on one or more elements of the one or more road segments using one or more paint materials characterized by reflecting light deviating, in a plurality of spectral ranges, by more than a certain value from the light reflected by a surface of the one or more elements.

Code instructions to output the painting instructions for applying the one or more paint materials on the one or more elements of the one or more road segments such that the driving assistance markings are visible in the plurality of spectral ranges.

According to a ninth aspect of the present invention there is provided a method of painting enhanced driving assistance markings visible in infrared light spectrum, comprising using one or more processors for:

Generating enhanced driving assistance markings expressing driving information relating to at least one road segment.

Computing instructions for painting a surface of at least one element of the at least one road segment using at least one paint material characterized by (1) reflecting light in a visible light spectral range deviating less than a first value from the visible light spectral range reflected by the surface and (2) transferring more than a second value of light in at least one infrared spectral range such that the enhanced driving assistance markings presented under the at least one paint material are visible.

Outputting the painting instructions for applying the at least one paint material on the surface.

According to a tenth aspect of the present invention there is provided a system for painting enhanced driving assistance markings visible in infrared light spectrum, comprising one or more processors configured to execute a code. The code comprising:

Code instructions to generate enhanced driving assistance markings expressing driving information relating to at least one road segment.

Code instructions to compute instructions for painting a surface of at least one element of the at least one road segment using at least one paint material characterized by (1) reflecting light in a visible light spectral range deviating less than a first value from the visible light spectral range reflected by the surface and (2) transferring more than a second value of light in at least one infrared spectral range such that the enhanced driving assistance markings presented under the at least one paint material are visible.

Code instructions to output the painting instructions for applying the at least one paint material on the surface.

According to an eleventh aspect of the present invention there is provided a method of detecting enhanced driving assistance markings visible in infrared light spectrum, comprising using one or more processors deployed in a vehicle for:

Receiving one or more images captured in one or more infrared spectral ranges.

The one or more images depicting enhanced driving assistance markings painted on one or more elements of one or more road segments under one or more paint materials characterized by (1) reflecting light in a visible light spectral range deviating less than a first value from the visible light spectral range reflected by a surface of the one or more elements and (2) transferring more than a second value of light in the one or more infrared spectral ranges such that enhanced driving assistance markings present under the one or more paint materials are visible in the one or more infrared spectral ranges.

Analyzing the one or more images captured in the one or more infrared spectral ranges to identify the enhanced driving assistance markings painted under the one or more paint materials.

Outputting the enhanced driving assistance markings.

According to a twelfth aspect of the present invention there is provided a system for detecting enhanced driving assistance markings visible in infrared light spectrum, comprising one or more processor deployed in a vehicle configured to execute a code. The code comprising:

Code instructions to receive one or more images captured in one or more infrared spectral ranges. The one or more images depicting enhanced driving assistance markings painted on one or more elements of one or more road segments under one or more paint materials characterized by (1) reflecting light in a visible light spectral range deviating less than a first value from the visible light spectral range reflected by a surface of the one or more elements and (2) transferring more than a second value of light in the one or more infrared spectral ranges such that enhanced driving assistance markings present under the one or more paint materials are visible in the one or more infrared spectral ranges.

Code instructions to analyze the one or more images captured in the one or more infrared spectral ranges to identify the enhanced driving assistance markings painted under the one or more paint materials.

Code instructions to output the enhanced driving assistance markings.

In a further implementation form of the first, second, third and/or fourth aspects, the first value equals 20% and the second value equals 25%.

In a further implementation form of the first, second, third and/or fourth aspects, the driving assistance markings are directed to support one or more automatic vehicular systems of at least one vehicle. The one or more automatic vehicular systems receive one or more images of the one or more elements painted with the driving assistance markings captured by one or more imaging sensors adapted to operate in the infrared light spectral range.

In a further implementation form of the first, second, third and/or fourth aspects, the driving information comprising information relating to one or more transportation infrastructure objects located in the one or more road segments and/or in one or more subsequent road segments.

In a further implementation form of the first, second, third and/or fourth aspects, the driving information comprising guiding markings to assist one or more automatic vehicular control systems of one or more vehicles to conduct one or more control operations of the one or more vehicles.

In a further implementation form of the first, second, third and/or fourth aspects, the one or more elements are members of a group consisting of: a surface of one or more of the road segments, a colored mark printed on one or more of the road segments and/or an infrastructure object located in proximity to one or more of the road segments.

In a further implementation form of the first and/or second aspects, the painting instruction comprise instructions for painting the driving assistance markings using the one or more paint materials closely around one or more visible markings of the one or more road segments.

In a further implementation form of the first and/or second aspects, the painting instruction comprise instructions for applying the one or more paint material over a painted surface of the one or more element.

In a further implementation form of the first and/or second aspects, the painting instruction comprise instructions for applying the one or more paint materials in conjunction with at least another one paint material used to paint a surface of the one or more elements.

In a further implementation form of the first, second, third and/or fourth aspects, the infrared light spectral range characteristic to one or more of the paint materials is in a range of near infrared (NIR) having a wavelength in a range of 750-1400 nanometers.

In a further implementation form of the first, second, third and/or fourth aspects, the infrared light spectral range characteristic to one or more of the paint materials is in a range of short wave infrared (SWIR) having a wavelength in a range of 1400-3000 nanometers.

In a further implementation form of the third and/or fourth aspects, the driving assistance markings are painted closely around at least one visible marking of the at least one road segment using the at least one paint material.

In a further implementation form of the third and/or fourth aspects, the at least one paint material painting is applied over a painted surface of the at least one element.

In a further implementation form of the third and/or fourth aspects, the at least one paint material painting is applied in conjunction with at least another one paint material used to paint a surface of the at least one element.

In a further implementation form of the fifth and/or sixth aspects, the analysis of the plurality of images to identify the aggregated driving assistance markings is based on segmentation by:

Applying one or more clustering algorithms to segment the one or more first images and the one or more second images.

Correlating respective segments in the segmented images to identify at least part of the driving assistance markings in the first spectral range and in the one or more second spectral ranges.

Identifying the aggregated driving assistance markings according to the correlated segments.

In a further implementation form of the fifth and/or sixth aspects, the analysis of the plurality of images to identify the aggregated driving assistance markings is based on edge detection by:

Applying one or more edge detection algorithms to the one or more first images to identify edges of at least part of the driving assistance markings in the first spectral range.

Applying the one or more edge detection algorithms to the one or more second images to identify edges of at least part of the driving assistance markings in the one or more second spectral ranges.

Correlating respective edges of at least part of the driving assistance markings identified in the first spectral range and in the one or more second spectral ranges.

Identifying the aggregated driving assistance markings according to the correlated edges of the driving assistance markings.

In a further implementation form of the fifth, sixth, seventh, eighth and/or ninth aspects, the plurality of spectral ranges are members of a group consisting of: visible light having a wavelength in a range of up to 700 nanometers, near infrared (NIR) having a wavelength in a range of 700-1000 nanometers and short wave infrared (SWIR) having a wavelength in a range of 1000-3000 nanometers.

In a further implementation form of the fifth, sixth, seventh, eighth and/or ninth aspects, the certain value equals 15%.

In a further implementation form of the fifth, sixth, seventh, eighth, ninth, tenth, eleventh and/or twelfth aspects, the driving assistance markings are directed to support one or more automatic vehicular systems of one or more vehicles. The support comprises one or more of:

Providing the one or more automatic vehicular systems information relating to one or more transportation infrastructure objects located in the one or more road segments and/or in one or more subsequent road segments.

Assisting the one or more automatic vehicular systems to conduct one or more control operations of the one or more vehicles.

In a further implementation form of the fifth, sixth, seventh, eighth, ninth, tenth, eleventh and/or twelfth aspects, the one or more elements is a member of a group consisting of: a section of the one or more road segments, a colored mark printed on the one or more road segments and/or an infrastructure object located in proximity to the one or more road segments.

In a further implementation form of the seventh, eighth, ninth and/or tenth aspects, the painting instruction comprise instructions for applying the one or more paint materials over a painted surface.

In a further implementation form of the seventh, eighth, ninth and/or tenth aspects, the painting instruction comprise instructions for applying the one or more paint materials over an unpainted surface.

In a further implementation form of the ninth, tenth, eleventh and/or twelfth aspects, the first value equals 15% and the second value equals 85%.

In a further implementation form of the ninth, tenth, eleventh and/or twelfth aspects, the enhanced driving assistance markings are encoded.

In a further implementation form of the ninth, tenth, eleventh and/or twelfth aspects, the enhanced driving assistance markings are painted on the surface under the at least one paint material.

In a further implementation form of the ninth, tenth, eleventh and/or twelfth aspects, the enhanced driving assistance markings are displayed by one or more display devices having a screen surface painted with the one or more paint materials.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

Figure 1:
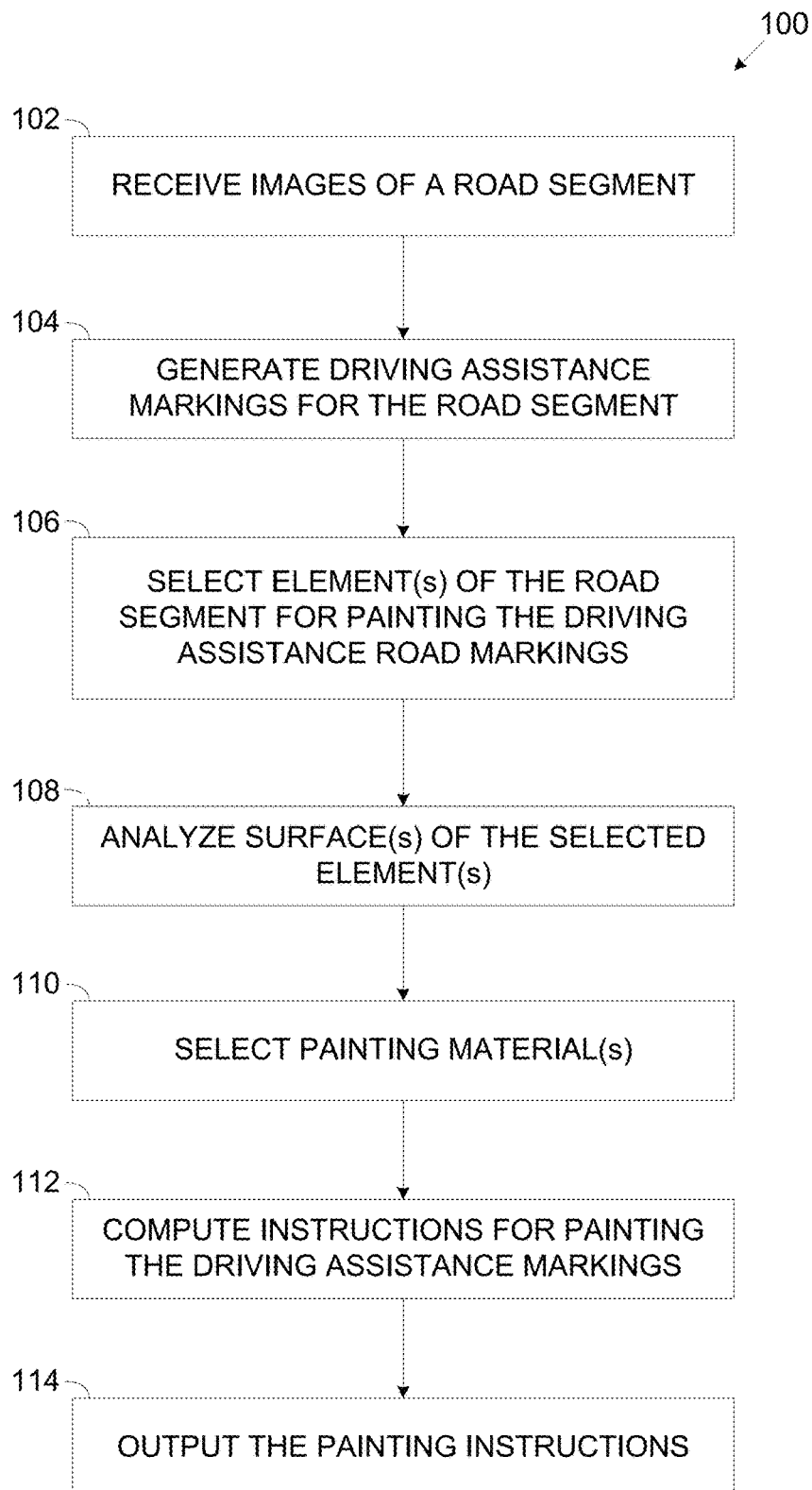
FIG. 1 is a flowchart of an exemplary process of computing instructions for painting driving assistance marking using paint material(s) visible in the infrared spectrum while imperceptible in the visible light spectrum, according to some embodiments of the present invention.

DESCRIPTION OF SPECIFIC EMBODIMENTS
OF THE INVENTION

The present invention, in some embodiments thereof, relates to painting driving assistance markings to support automated vehicular systems, and, more specifically, but not exclusively, to painting driving assistance markings which are visible in the infrared spectrum while imperceptible in the human visible light spectrum to support automated vehicular systems.

According to some embodiments of the present invention, there are provided methods, systems and computer program products for computing instructions for painting driving assistance markings which are highly visible in the infrared light spectrum while highly imperceptible in the visible light spectrum. In particular, the driving assistance markings may significantly blend with their background in the visible light range making them significantly imperceptible by the human eye and thus invisible to human drivers.

The term imperceptible as used here in through the document defines objects, markings, printing and/or the like, in particular driving assistance markings which may not be perceived by the human eye since they reflect light in a spectral range which is out of the visible light spectral range (400-700 nanometer).

These driving assistance markings which are highly imperceptible to the human drivers are therefore directed to support automated vehicular systems, for example, an Advanced Driving Assistance System (ADAS), a vehicular monitoring system, a vehicular alert system, a vehicular control system and/or the like installed in one or more vehicles which may be manual, partially autonomous and/or fully autonomous.

Specifically, the driving assistance markings are directed for such automated vehicular systems which are capable of operating in the infrared light spectrum, in particulate, systems which are coupled, integrated and/or connected to one or more imaging sensors, for example, a camera, an infrared camera, a thermal mapping camera and/or the like configured to capture images of the vehicle's surroundings in the infrared spectrum, for example, Near Infrared (NIR), Short Wave Infrared (SWIR) and/or the like.

The driving assistance markings generated for one or more road segments may express informative directions and/or operation assistance information. For example, one or more informative driving assistance markings may indicate presence and optionally distance to one or more objects in the respective road segment and/or of one or more subsequent road segments, for example, a pedestrian crossing, a railroad crossing, a traffic light, a junction, a maximal allowed speed and/or the like. In another example, one or more operation assistance driving assistance markings may include markers, pointers, guides, keys and/or the like which may be identified and used by the automated vehicular systems to maneuver the vehicles, for example, break, accelerate, decelerate, turn and/or the like.

The driving assistance markings generated for the road segment(s) may be painted (applied) on one or more elements of the respective road segment, for example, one or more surface sections of the road segment, one or more colored marks painted on the road segment (e.g., lane separator lines, arrows, stop lines, pedestrian crossings, etc.) and/or one or more infrastructure objects located in proximity to the road segment (e.g., next to, on, above, etc.), for example, pavement surfaces and/or edges, traffic poles, traffic lights, structure walls and/or the like.

In order to ensure that the driving assistance markings are highly visible in the infrared spectrum while substantially imperceptible in the visible light spectrum and hence imperceptible to the human drivers, the driving assistance markings may be painted to significantly blend with their background in the visible light range while be significantly distinguishable from their background in the infrared spectral range. To this end the driving assistance markings may be painted using one or more infrared reflective paint materials which are characterized by two main characteristics.

First, the infrared reflective paint materials selected for painting the driving assistance markings must not significantly deviate from the color of the surface of the element(s) selected for painting the driving assistance markings. This means that the visible light reflected by the selected infrared reflective paint material(s) must not deviate by more than a certain value (e.g. 10%, 15%, 20%, etc.) from the visible light spectrum reflected by the surface of the selected element(s).

In addition, the infrared reflective paint materials selected for painting the driving assistance markings must be significantly distinguishable from the surface of the selected element(s) in the infrared spectrum. This means that the infrared spectral range reflected by the selected infrared reflective paint material(s) must deviate by more than a certain value (e.g. 25%, 30%, 35%, etc.) from the infrared spectral range reflected by the surface of the selected element(s).

While for brevity the paint material(s) selected for painting the driving assistance markings are designated infrared reflective paint materials, obviously, the deviation of the infrared reflective paint material(s) compared to their background may be to both directions. This means that the paint material(s) used for painting the driving assistance markings may be more infrared reflective or more absorptive compared to the surrounding background of the markings, i.e., the surface of the selected element(s) on which the markings are painted. When the paint material(s) is more infrared reflective, the driving assistance markings will reflect more infrared light compared to their surrounding background and will be thus visible in the infrared spectrum range.

When the paint material(s) is more infrared absorptive, i.e., less infrared reflective, the driving assistance markings will reflect less infrared light compared to their surrounding background and will be therefore also visible in the infrared spectrum range.

Optionally, the driving assistance markings may be painted in proximity, specifically closely around one or more visible road markings of one or more of the road segments, for example, lane separator markings, road side border line markings, pedestrian crossings, painted direction symbols, painted text and/or the like.

Painting the driving assistance markings using the infrared reflective paint materials and computing instructions thereof may present major advantages and benefits compared to currently existing methods and systems for applying road markings in roads.

First, while the human perception and recognition of road markings may be limited, the automated vehicular systems may have a significantly larger capacity for detecting and recognizing large volumes of road markings. These automated vehicular systems may therefore benefit from extensive additional driving assistance markings which may express and deliver increased volumes of information relating to the road segments and/or may provide increased, improved and/or enhanced assistance with vehicle control actions. However, in case the extensive road markings are visible as may be done using existing methods for applying road markings, the road markings may cause a major clutter which may significantly overload human drivers' perception which may lead to human mistakes potentially resulting in dangerous scenarios and increased risk on the road. In contrast, painting (applying) the additional driving assistance markings using the infrared reflective paint material(s) such that the driving assistance markings are imperceptible to the human drivers while visible to the infrared capable automated vehicular systems may overcome the clutter limitation while highly enhancing the assistance and support to the automated vehicular systems.

Moreover, existing (legacy) automated vehicular systems which similarly to the human drivers rely on visible light road markings may be also highly degraded in case the additional driving assistance markings are visible in the visible light spectrum. Such existing (legacy) automated vehicular systems may be limited in their ability to distinguish between extensive road markings painted in close proximity and all visible in the same light spectrum. On the other hand, the existing automated vehicular systems may be oblivious and unaware of the additional driving assistance markings which are only visible in the infrared spectrum thus prevent the overload and degradation in the operation of these legacy systems.

Furthermore, applying (painting) driving assistance markings in two different light spectrums, namely the visible light and the infrared spectrums may allow for increased detection and/or redundancy since the road markings, even identical markings, may be captured by imaging sensors in two distinct domains. The performance, for example, accuracy, robustness, reliability and/or certainty of the detection of the automated vehicular systems may be highly increased when relying on imagery data captured in both the visible light and infrared spectrums, typically by different imaging sensors. Moreover, visible light markings may be significantly undetectable under certain circumstances, for example, low illumination, large distance and/or the like. Relying on the infrared visible road markings may therefore enable the automated vehicular systems to operate with high performance in such scenarios.

In addition, distracting objects which are typically visible in the visible light spectrum, for example, spilled paint, trash and/or any other object that may be located on the road segment or in its close vicinity may be erroneously detected and/or interpreted by the automated vehicular systems as valid road markings which are visible in the visible light spectrum. Such degraded detection may result in potential erroneous detection that may lead to dangerous, critical and even fatal situation. Painting the driving assistance markings to be visible in the infrared spectrum, on the other hand, may significantly increase the detection performance, specifically robustness, reliability and/or reliability since infrared reflectance and/or absorption may be rare in naturally occurring objects such as the distracting objects thus making these naturally occurring objects significantly imperceptible in the infrared spectrum which may reduce and even completely prevent erroneous detection of these object as valid road markings.

Also, adding visible road markings (visible in the visible light spectrum) may be subject to regulation since they may affect the road conditions and perception as described herein before. Adding the infrared visible driving assistance markings on the other hand, may not be subject to any such regulation which may be highly costly, timely and/or demanding, since the additional road markings are imperceptible and practically invisible to the human drivers and/or to the existing automated vehicular systems configured to operate in the visible light spectrum.

Finally, painting the infrared visible driving assistance markings in proximity to visible road markings may significantly increase accuracy, robustness, reliability and/or certainty of the automated vehicular systems to detect of the driving assistance markings. Moreover, the automated vehicular systems may ignore and/or avoid erroneous interpretation of potential infrared reflective materials and/or sections of the road segment arbitrarily present in one or more of the road segments.

According to some embodiments of the present invention, there are provided methods, systems and computer program products for computing instructions for painting, in one or more road segments, driving assistance markings which are highly visible in a plurality of spectral ranges, specifically in the visible light spectral range and in one or more infrared light spectral ranges, for example NIR, SWIR and/or the like.

Specifically, the driving assistance markings painted to be visible in the plurality of light spectral ranges are such markings which are typically and/or traditionally painted using paint materials visible in the visible light spectral range, for example, 4400-70 nanometer (nm). Such driving assistance markings may include road painted markings (e.g. lane separator lines, arrows, stop lines, pedestrian crossings, etc.), traffic signs and/or the like. The driving assistance markings may be therefore identical in the plurality of spectral ranges.

In order to ensure that the driving assistance markings are highly visible in both the visible light spectrum and in the infrared spectrum, the driving assistance markings may be painted to significantly stand out and be distinguishable from their background both in the visible light range and in the infrared spectral range. To this end the driving assistance markings may be painted using one or more infrared reflective paint materials which are characterized by significantly deviating by more than a certain value (e.g. 15%, 20%, 25%, etc.) from the light reflected by the surface of the selected element(s) in the plurality of light spectral ranges, for example, the visible light range and one or more of the infrared spectral ranges.

As described herein before, the paint material(s) selected for painting the driving assistance markings may include infrared reflective paint materials and/or absorptive compared to the surrounding background of the markings, i.e., the surface of the selected element(s) on which the markings are painted. However, in the visible light range the selected infrared reflective paint material(s) may be very similar in their light reflection characteristics to corresponding standard paint materials.

One or more of the automated vehicular systems may be configured to identify the driving assistance markings and/or part thereof in at least some of the plurality of spectral ranges. The automated vehicular system(s) may be further configured to aggregate the driving assistance markings detected across the multiple spectral ranges.

In particular, the automated vehicular system(s) may receive a plurality of images from one or more of the imaging sensors configured to operate in the plurality of light spectral ranges. The received images may therefore depict the driving assistance markings and/or part thereof in at least some of the plurality of spectral ranges, for example, visible light, NIR, SWIR spectral ranges and/or the like.

The automated vehicular system(s) may be further configured to analyze the images to identify the driving assistance markings and/or part thereof in the at least some spectral ranges and may aggregate the driving assistance markings detected across multiple spectral ranges to generate aggregated driving assistance markings, Applying (painting) the driving assistance markings using the infrared reflective paint materials distinguishable from its background in the plurality of light spectral ranges may present major advantages and benefits compared to currently existing methods and systems for applying road markings.

First, applying the driving assistance markings using one or more paint materials which are visible in the plurality of spectral ranges, for example, both in the visible light spectral range and in one or more of the infrared light spectrum ranges may make the driving assistance markings highly visible and distinguishable from surrounding and/or background objects. The multi-range driving assistance markings may therefore allow for increased detection and/or redundancy since the driving assistance markings may be captured by imaging sensors in multiple distinct spectral domains. The performance, for example, completeness, accuracy, robustness, reliability and/or certainty of the detection of the automated vehicular systems may be highly increased when relying on imagery data captured in several light spectral ranges, for example, visible light and one or more infrared spectrums. Moreover, visible light markings may be significantly undetectable under certain circumstances, for example, low illumination, large distance and/or the like and complementing the visible light detection of the driving assistance with detection in the infrared region(s) may further increase the detection performance.

Moreover, in the visible light spectrum, background objects may often blend with the driving assistance markings such that they may become undistinguishable from the background. For example, assuming a certain colored traffic sign is located such that from one or more viewpoints the traffic sign may overlap with a colored commercial sign placed next to the road. In such case, the driving assistance markings may not be easily identified, specifically by the automated vehicular system(s). However, in the infrared spectral range(s), the driving assistance markings may be typically highly distinguishable from the commercial sign which may have completely different reflection characteristics in the infrared spectral range(s) such that the automated vehicular system(s) may easily detect the driving assistance markings in the infrared spectral range(s). The automated vehicular system(s) may further aggregate the driving assistance markings detected in the infrared spectral range(s) with those detected in the visible light spectrum to create the aggregated driving assistance markings which may obviously be significantly more complete, accurate and/or reliable compared to the driving assistance markings detected in any single spectral range.

Furthermore, due to one or more environmental conditions, for example, low illumination, mist and/or the like detecting driving assistance markings in the visible light spectrum may be significantly degraded. However, in the infrared spectral range(s) such environmental conditions may have significantly less affect and the driving assistance markings painted with the inferred reflective paint material(s) may be therefore highly more visible and thus significantly better detectable.

In addition, since in the visible light range the selected infrared reflective paint material(s) used to paint the driving assistance markings may have light reflection characteristics similar to corresponding standard paint materials, the driving assistance markings may fully comply with regulations and/or directives applied worldwide for the driving assistance markings, specifically in the visible light spectrum.

According to some embodiments of the present invention, there are provided methods, systems and computer program products for computing instructions for painting, in one or more road segments, enhanced driving assistance markings which are highly visible in the infrared light spectral range, for example NIR, SWIR and/or the like while highly imperceptible in the visible light spectrum.

Specifically, the enhanced driving assistance markings which are directed for supporting and/or assisting one or more of the automated vehicular system(s) may be painted and/or presented beneath standard driving assistance markings directed for human drivers and/or for automated vehicular system(s) such that in the visible light spectrum the enhanced driving assistance markings may appear as standard legacy driving assistance markings. However, in one or more infrared spectral ranges, the enhanced driving assistance markings may present additional and/or alternative driving assistance markings which may be complementary, more elaborate, more extensive and/or the like with respect to the visible light driving assistance markings.

The enhanced driving assistance markings may be painted and/or presented on one or more of the selected elements(s) which may be painted using one or more semi-transparent paint materials which are characterized by two main characteristics. First, the semi-transparent paint materials selected for painting the standard driving assistance markings must not significantly deviate from the color of the surface of the selected element(s). This means that the visible light reflected by the selected semi-transparent paint material(s) must not deviate by more than a certain value (e.g. 10%, 15%, 20%, etc.) from the visible light spectrum reflected by the surface of the selected element(s). In addition, the semi-transparent paint material(s) must be significantly transparent in one or more of the infrared spectral ranges, for example, NIR, SWIR and/or the like meaning that the semi-transparent paint material(s) must transfer at least a certain value of infrared light, for example, 80%, 85%, 90% and/or the like.

The enhanced driving assistance markings may be first painted on one or more selected elements of the road segment(s) using one or more paint materials, for example, paint materials which are highly reflective and/or absorptive and hence highly visible in the visible light spectrum, one or more infrared spectrum (e.g. NIR, SWIR) and/or the like. Optionally, standard driving assistance markings may be painted over the enhanced driving assistance markings using the semi-transparent paint material(s).

Optionally, the enhanced driving assistance markings are presented via one or more display devices having one or more screen surfaces which may be painted with the standard driving assistance markings may be then painted over the enhanced driving assistance markings using the semi-transparent paint material(s).

Optionally, the enhanced driving assistance markings may be encoded using one or more encoding methods, techniques and/or algorithms to increase amount of data expressed by the enhanced driving assistance markings.

One or more of the automated vehicular systems may be configured to identify the enhanced driving assistance markings in the infrared spectral range(s). In particular, the automated vehicular system(s) may receive one or more images from one or more of the imaging sensors configured to operate in one or more of the light spectral ranges, in particular, in the infrared spectral range, for example, NIR, SWIR and/or the like. The received image(s) captured in the infrared spectrum may therefore depict the enhanced driving assistance markings printed under the semi-transparent paint material(s) which transfers the infrared light.

Applying the enhanced driving assistance markings using the semi-transparent paint material(s) may present major advantages and benefits compared to currently existing methods and systems for applying road markings.

First, providing the enhanced driving assistance markings which may be significantly more elaborate and/or extensive may thus include additional, alternative and/or complementary data (collectively designated additional data). Using the additional data, the automated vehicular system(s) may significantly increase their performance, for example, improved positioning and/or orientation, obtaining additional information relating to the road segment(s) which may be used for improved operation of the vehicle, for example, increased accuracy, reliability, safety and/or the like.

Moreover, since the visible light characteristics of the semi-transparent paint material(s) are similar to those of the surface of the object(s) on which the enhanced driving assistance markings are presented, in the visible light spectrum the enhanced driving assistance markings are imperceptible thus not affecting appearance of the element(s) surface. Moreover, in case the enhanced driving assistance markings are presented under standard driving assistance markings, the standard driving assistance markings are not altered and/or affected such that the standard driving assistance markings fully comply with the driving assistance markings regulations and/or directives.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of computing instructions for painting driving assistance marking using paint material(s) visible in the infrared spectrum while imperceptible in the visible light spectrum, according to some embodiments of the present invention.

An exemplary process 100 may be executed for computing instructions for painting driving assistance markings to support one or more automated vehicular systems, for example, an ADAS system, a vehicular monitoring system, a vehicular alert system, a vehicular control system and/or the like installed in one or more vehicles which may be fully manual with one or more alert systems, partially autonomous and/or fully autonomous.

Specifically, the driving assistance markings are painted on one or more elements of one or more road segments such that the driving assistance markings are highly visible in the infrared spectral range (e.g. NIR, SWIR) while significantly imperceptible and thus practically invisible in the visible light range. Imperceptible in the visible light spectrum, the driving assistance markings are therefore highly imperceptible by human drivers as well as to automated vehicular systems which are based in visible light imaging.

Automated vehicular systems which are capable of analyzing infrared spectrum images on the other hand may identify the driving assistance markings which may express informative and/or operation assistance information.

The imperceptible driving assistance markings may therefore provide additional driving assistance information beyond the traditional road markings which may be used by the infrared enabled vehicular systems while preventing visual clutter which may overload perception of the drivers and/or of the visual light spectrum based systems.

Figure 2:
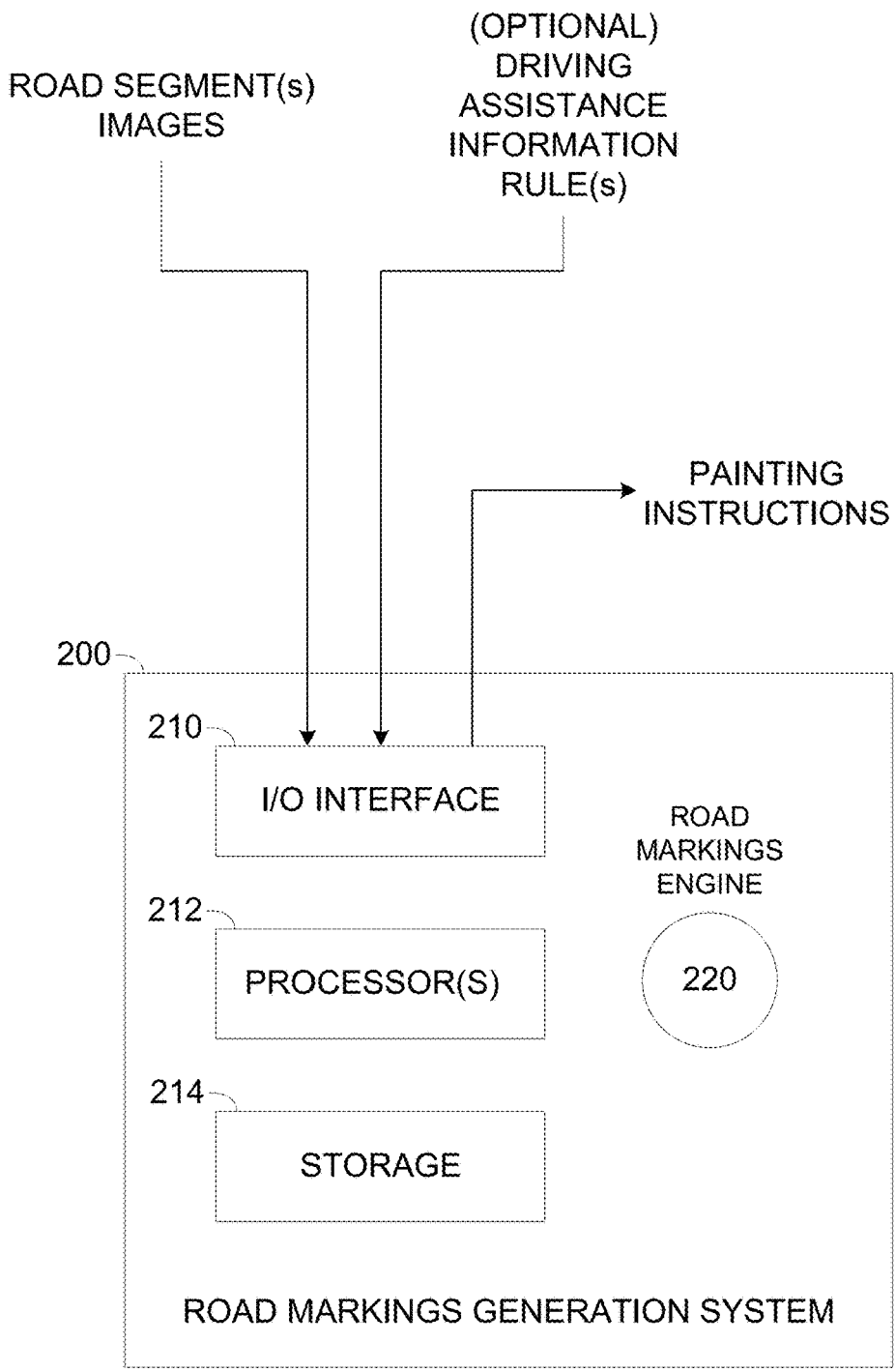
FIG. 2 is a schematic illustration of an exemplary system for computing instructions for painting driving assistance marking using paint material(s) visible in the infrared spectrum while imperceptible in the visible light spectrum, according to some embodiments of the present invention.

Reference is also made to FIG. 2, which is a schematic illustration of an exemplary system for computing instructions for painting driving assistance marking using paint material(s) visible in the infrared spectrum while imperceptible in the visible light spectrum, according to some embodiments of the present invention.

An exemplary road markings generation system 200, for example, a computer, a server, a processing node, a cluster of computing nodes and/or the like may be configured to execute a process such as the process 100 for computing instructions for painting driving assistance markings which are visible in in the infrared spectrum wile imperceptible in the visible light spectrum.

The road markings generation system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the road markings generation system 200 may obtain, for example, fetch, receive, acquire and/or the like one or more images of one or more road segments. For example, the road markings generation system 200 may connect to one or more of the networks, through the network interface(s) available in the I/O interface 210, to communicate with one or more networked resources storing one or more of the images. In another example, the road markings generation system 200 may access one or more attachable devices attached to interconnection interface(s) available in the I/O interface 210, for example, a USB storage device storing, capturing and/or recording one or more of the images.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the road markings generation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a road markings engine 220 functional module for executing the process 100 to generate driving assistance markings and compute instructions for painting the driving assistance markings using one or more infrared visible paint materials such that the driving assistance markings are highly visible in the infrared spectrum while significantly imperceptible and potentially completely invisible in the visible light spectrum.

The road markings engine 220 may further output the painting instructions computed for painting the driving assistance markings using one or more of the infrared visible paint materials.

Optionally, the road markings engine 220 may receive one or more driving assistance information rules which may be applicable for one or more of the road segments.

Optionally, the road markings generation system 200, specifically the road markings engine 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

For brevity, the process 100 executed by road markings engine 220 is described for computing instructions for painting driving assistance markings in a single road segment. This, however, should not be construed as limiting since the process 100 may be expanded for computing painting instructions for driving assistance markings in a plurality of road segments.

As shown at 102, the process 100 starts with the road markings engine 220 receiving one or more images of a road segment.

The image(s) may be captured at ground level, from an elevated location (e.g. building, poles, posts, etc.), from the air (e.g. by a drone, an aircraft, etc.), from space (satellite) and/or the like such that the road segment may be depicted from one or more elevation points and/or angles.

The road markings engine 220 may receive the image(s) from one or more sources. For example, one or more images may be retrieved from one or more data stores, for example, a database, a storage server, a storage service and/or the like which stores images depicting one or more road segments. In another example, one or more of the images may be received from one or more mapping services, for example, goggle earth, google street view and/or the like.

As shown at 104, the road markings engine 220 may generate driving assistance markings for the road segment, in particular the road markings engine 220 may generate the driving assistance markings based on analysis of the image(s) of the road segment.

The computed driving assistance markings are directed to support one or more automated vehicular systems of one or more vehicles riding through the road segment.

Such automated vehicular systems may include, for example, one or more ADAS systems as known in the art configured to assist vehicle drivers. In another example, the automated vehicular systems may include one or more monitoring systems configured to monitor the environment of the vehicle and report, alert and/or otherwise indicate of one or more potential hazards, risks and/or conditions detected in the road segment. In another example, the automated vehicular systems may include one or more automatic vehicular control systems of one or more at least partially autonomous vehicles configured to control operation of the vehicle (e.g. break, maneuver, accelerate, etc.) based on one or more conditions, potential hazards and/or the like detected in the road segment.

Specifically, the driving assistance markings generated by the road markings engine 220 are intended to be added (painted) to the road segment such that the driving assistance markings are visible in the infrared spectrum, for example, NIR, SWIR and/or the like while significantly imperceptible in the visible light spectrum. The driving assistance markings are therefore directed to support automated vehicular systems which are capable of operating in the infrared spectrum, in particular, automated vehicular systems which integrate, employ, connect and/or communicate with one or more imaging sensors, for example, a camera, infrared camera, a thermal camera and/or the like adapted to operate in the infrared spectral range, for example, NIR, SWIR and/or the like.

The driving assistance markings generated by the road markings engine 220 may express driving information relating to the road segment. The driving information expressed by the driving assistance markings may include descriptive information relating to one or more transportation infrastructure objects located in the road segment as identified by analyzing the image(s), for example, a junction, a traffic light, a traffic sign, a pedestrian crossing, a bridge, a tunnel, a freeway and/or the like. For example, assuming there is a 4-way junction in the road segment with traffic lights and pedestrian crossings in all four directions. In such case, the road markings engine 220 may generate driving assistance markings which report the presence of the 4-way junction in the road segment. In particular, the road markings engine 220 may generate driving assistance markings which indicate the distance to the 4-way junction in the road segment, for example, the 4-way junction is 50 meters ahead, 30 meters ahead, 10 meters ahead and/or the like. In another example, assuming there is a sharp left curve in the road segment. In such case, the road markings engine 220 may generate driving assistance markings which report the presence of the sharp left curve in the road segment and may further configure the driving assistance markings to indicate the distance to the sharp left curve.

The driving assistance markings may further express driving information directed to assist one or more of the automatic vehicular control systems of at least one vehicle to conduct at least one control operation of the at least one vehicle. For example, assuming there is a sharp right curve in the road segment. In such case, the road markings engine 220 may generate orientation points road markings extending from a certain distance before the beginning of the right curve through the curve and until the curve end which may be used by the automatic vehicular control system(s) to accurately maneuver the respective vehicle(s) in the sharp curve. In another example, assuming there is a traffic light in the road segment. In such case, the road markings engine 220 may mark a stop line road markings right before the traffic light where vehicles must come to a complete stop. The stop line road markings may be used by as orientation points by the automatic vehicular control system(s) to identify the exact stop location and may control the vehicle(s) accordingly, apply breaks to fully stop the vehicle(s).

The driving assistance markings generated by the road markings engine 220 may express driving information similar to driving information expressed by visible road markings in the road segment which are visible in the visible light spectrum. This may of course be essential for supporting automatic vehicular control systems connected to imaging sensors which operated only in the infrared spectrum and hence monitor the surrounding of the vehicles in the infrared spectrum. However, duplicating the driving assistance markings may also serve for redundancy and/or to improve detection of the road markings in both the visible light spectrum and in the infrared spectrum for automatic vehicular control systems capable of monitoring the surrounding of the vehicle(s) in both the visible light and infrared spectrums.

However, the driving assistance markings generated by the road markings engine 220 may include and/or express additional driving information which is not expressed and/or available from the visible road markings. Traditionally, the road markings are directed for human drivers and are thus presented (painted, drawn, placed, etc.) to be visible in the visible light spectrum. The amount of information expressed by the road markings which may be efficiently consumed and comprehended by human drivers may be limited. The automatic vehicular control system(s) on the other hand may be able to acquire and process much larger volumes of driving information expressed by road markings. However, adding additional driving information visible to the human drivers may lead to major clutter which may overload perception and/or confuse the human drivers and may be therefore inefficient and potentially dangerous.

Expressing the additional driving information via the infrared visible driving assistance markings may therefore overcome this limitation since the driving assistance markings are substantially and potentially completely imperceptible to the human drivers while visible to the infrared capable automatic vehicular control system(s) which may use the additional driving information.

The driving assistance markings may include human readable markings which may be identified and recognized by automatic vehicular control system(s) designed, configured and/or adapted to rely on road markings directed for human drivers. However, the driving assistance markings may further include markings, signs, symbols, expressions and/or the like which are directed for machines and may thus not be comprehended by humans, for example, coded data (e.g. barcode, QR code, etc.), machine language symbolic data and/or the like. While incomprehensible by humans, automatic vehicular control system(s) configured accordingly may be of course able to identify, decipher and use such machine directed driving assistance markings.

Optionally, the road markings engine 220 may generate driving assistance markings which are applied in the (current) road segment but may relate to one or more transportation infrastructure objects located in one or more subsequent road segments located after the (current) road segment. For example, assuming there is a mountain tunnel one mile ahead of the (current) road segment. Further assuming that one or more automatic vehicular control system(s) include radar sensors highly suitable for low and/or no illumination imaging. In such case, the automatic vehicular control system(s) may bring the radar sensors online and/or test them prior to entry into the tunnel.

Optionally, the road markings engine 220 may compute one or more of the driving assistance markings according to one or more of the driving assistance information rules which may be received from one or more sources.

The driving assistance information rules may include one or more general rules applicable for a plurality of road segments sharing one or more parameters and/or attributes. For example, a certain general driving assistance information rule may indicate that each road segment which comprises a pedestrian crossing should include driving assistance markings at one or more locations preceding the pedestrian crossing (e.g. 100 meters, 50 meters, 15 meters, etc.) to inform of the upcoming pedestrian crossing. In another example, a certain general driving assistance information rule may indicate that driving assistance markings should be included in each road segment to indicate a maximum speed allowed in the respective road segment. In another example, a certain general driving assistance information rule may indicate that curve orientation points driving assistance markings should be included in each road segment comprising one or more curves exceeding a certain curve angle, for example, 10 degrees, 15 degrees, 25 degrees and/or the like.

However, the driving assistance information rules may also include one or more specific rules applicable for one or more specific road segments. For example, a certain specific driving assistance information rule may indicate that special driving assistance markings should be applied in the road segment in case the specific road segment includes a traffic circle immediately followed by another traffic circle within less than a certain distance, for example, 50 meters, 80 meters and/or the like. The special driving assistance markings which may be applied before the first circle may express the multiple traffic circles which may require some special attention by tone or more of the automatic vehicular control systems.

As shown at 106, the road markings engine 220 may analyze the image(s) of the road segment to identify and select one or more elements of the road segment which are suitable for applying (painting) the driving assistance markings generated for the road segment.

The elements on which the driving assistance markings may be painted nay include, for example, one or more surface sections of the road segment, one or more colored marks painted on the road segment, one or more infrastructure objects located in proximity to the road segment (e.g., next to, on, above, etc.) and/or the like. The colored marks painted on the road segment may include visible road markings such as, for example, lane separator markings, road side border line markings, pedestrian crossings, painted direction symbols (e.g., arrows, stop lines, etc.), painted text (e.g. stop, slow, etc.) and/or the like. The infrastructure objects may include, for example, pavement edges, traffic poles, traffic lights, structures wall and/or the like.

Figure 3A:
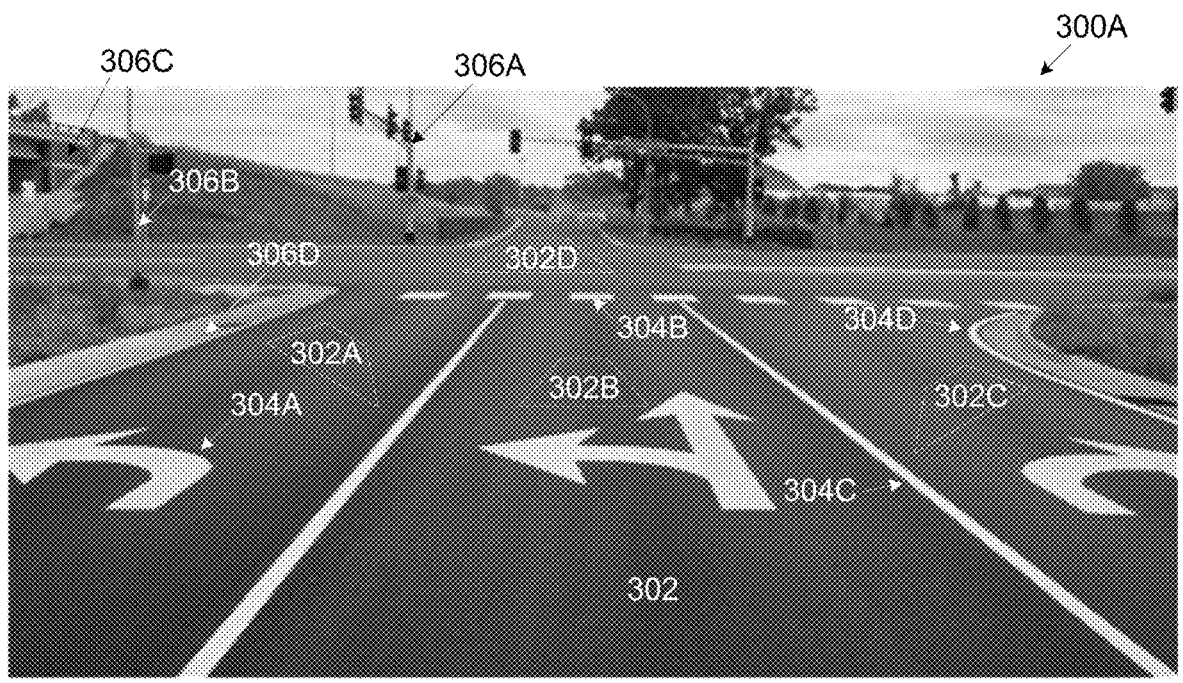
FIG. 3A and FIG. 3B are exemplary road segments comprising elements suitable for painting driving assistance marking painted using paint material(s) visible in the infrared spectrum while imperceptible in the visible light spectrum, according to some embodiments of the present invention.
Figure 3B:

Reference is now made to FIG. 3A and FIG. 3B, which are exemplary road segments comprising elements suitable for painting driving assistance markings painted using paint material(s) visible in the infrared spectrum while imperceptible in the visible light spectrum, according to some embodiments of the present invention.

An exemplary road segment 300A may comprise a plurality of elements which may be identified by a road markings engine such as the road markings engine 220 as suitable for applying (painting) the driving assistance markings generated for the road segment. For example, the road markings engine 220 analyzing one or more images of the road segment 300A may identify one or more surface sections 302 of the road segment 300A which may be suitable for painting the driving assistance markings, for example, surface section 302A, 302B, 302C and/or 302D. In another example, the road markings engine 220 analyzing one or more images of the road segment 300A may identify one or more visible road markings 304 painted in the road segment 300A which may be suitable for painting the driving assistance markings, for example, an arrow marking 304A, a pedestrian crossing marking 304B a lane separator line 304C and and/or a road border line 302D. In another example, the road markings engine 220 analyzing one or more images of the road segment 300A may identify one or more infrastructure object 306 of the road segment 300A which may be suitable for painting the driving assistance markings, for example, a traffic light pole 306A, a lighting pole 306B, a wall of a bridge 306C and/or a sidewalk surface 306D.

An exemplary road segment 300B may also comprise a plurality of elements which may be identified by the road markings engine 220 as suitable for applying (painting) the driving assistance markings generated for the road segment. For example, the road markings engine 220 analyzing one or more images of the road segment 300B may identify one or more visible road markings 304 painted in the road segment 300B which may be suitable for painting the driving assistance markings, for example, a road border line 302D. In another example, the road markings engine 220 analyzing one or more images of the road segment 300B may identify one or more infrastructure object 306 of the road segment 30BA which may be suitable for painting the driving assistance markings, for example, a side barrier rail 306E.

The road markings engine 220 may therefore analyze the image(s) to identify one or more elements in the road segments which may be suitable for painting the generated driving assistance markings. In particular, the road markings engine 220 may select one or more of the identified elements according to the generated driving assistance markings.

For example, assuming the road segment comprises a pedestrian crossing and the road markings engine 220 generated driving assistance markings accordingly to indicate the presence of the pedestrian crossing and further indicate a distance to the pedestrian crossing. In such case, the road markings engine 220 may select one or more visible road markings, for example, lane separator lines for applying (painting) the driving assistance markings. In particular, the road markings engine 220 may select one or more lane separator lines and/or line sections which are located at the distance from the pedestrian crossing as indicated by the respective driving assistance markings. For example, assuming three driving assistance markings are generated to indicate the pedestrian crossing is 10, 30 and 50 meters ahead. In such case, the road markings engine 220 may select three lane separator lines and/or line sections located at 10, 30 and 50 meters before the pedestrian crossing on which the respective driving assistance markings may be painted.

In another example, assuming the road segment comprises a junction and the road markings engine 220 generated driving assistance markings accordingly to indicate the presence of the junction. In such case, the road markings engine 220 may select one or more road surfaces of the road segment for applying (painting) the driving assistance markings indicating the upcoming junction. For example, the road markings engine 220 may select a plurality of consecutive surface sections of the road segment for painting decrementing distance values to the junction.

In another example, assuming the road segment comprises a railroad intersection and the road markings engine 220 generated driving assistance markings accordingly to indicate the presence of the railroad intersection. In such case, the road markings engine 220 may select one or more infrastructure objects, for example, a slowdown traffic sign pole for applying (painting) the driving assistance markings indicating the upcoming railroad intersection.

Moreover, the road markings engine 220 may adjust one or more of the driving assistance markings according to the selected element(s) on which the driving assistance markings generated for the road segment are to be painted. For example, assuming the road markings engine 220 selects a traffic pole located 45 meters before an intersection for painting driving assistance markings indicative of the intersection, the road markings engine 220 may adjust and/or generate the driving assistance markings which are to be applied on the traffic pole to indicate that the intersection is 45 meters ahead. In another example, assuming the road markings engine 220 selects a series of lighting poles distributed along a sharp curve for applying (paining) orientation points driving assistance markings to assist the automatic vehicular control systems to maneuver the vehicles along the curve. In such case, the road markings engine 220 may adjust the size of the orientation points to fit the lighting poles while ensuring high visibility of the orientation points.

As shown at 108, the road markings engine 220 may analyze one or more of the surfaces of one or more of the selected element(s) on which the driving assistance markings generated for the road segment are to be painted. In particular, the road markings engine 220 may analyze the image(s) of the road segment to identify a color of the surface(s) of the selected element(s) and more specifically to identify the spectral range of visible light reflected by the surface(s) of the selected element(s).

For example, assuming the road markings engine 220 selects a certain road surface section of the road segment for applying the driving assistance markings, the road markings engine 220 may identify that the road surface section is a black asphalt surface which accordingly reflects visible light in a spectral range corresponding to black color. In another example, assuming the road markings engine 220 selects a certain road marking of the road segment for applying the driving assistance markings, the road markings engine 220 may identify that the road marking is painted white and thus reflects visible light in a spectral range corresponding to white color. In another example, assuming the road markings engine 220 selects a certain traffic pole of the road segment for applying the driving assistance markings, the road markings engine 220 may identify that the traffic pole is painted and/or coated with gray paint and thus reflects visible light in a spectral range corresponding to gray color.

As shown at 110, the road markings engine 220 may select one or more paint materials for applying (painting) the driving assistance markings generated for the road segment on the selected element(s) of the road segment.

Specifically, the road markings engine 220 may select infrared reflective paint material(s) which reflect infrared light in one or more infrared spectral ranges, for example, NIR (750-1400 nm), SWIR (1400-3000 nm) and/or the like and are further characterized by two main characteristics.

First, each of the selected paint materials may reflect light in the visible light spectral range which is substantially similar to the visible light spectral range of the surface(s) of the selected object(s) on which the driving assistance markings are to be applied. Specifically, each paint material selected for painting the driving assistance markings may deviate by less than a first value from the visible light spectral range reflected by the respective surface of the respective element. The first value, for example, 15%, 20%, 25% and/or the like may be set to ensure that the selected paint material(s) is not substantially visible in the visible light spectrum when painted on the selected element(s).

Second, each of the selected paint materials may reflect light in the infrared spectral range which is substantially different from the infrared spectral range of the surface(s) of the selected object(s) on which the driving assistance markings are to be applied. Specifically, each paint material selected for painting the driving assistance markings should deviate by more than a second value from the infrared spectral range reflected by the respective surface of the respective element. The second value, for example, 25%, 30%, 35% and/or the like may be set to ensure that the selected paint material(s) is substantially visible in the infrared light spectrum when painted on the selected element(s).

For brevity the paint material(s) selected for painting the driving assistance markings are designated infrared reflective paint materials. However, the deviation in the reflectance of infrared light may be to both directions, meaning that the paint material(s) selected for painting the driving assistance markings may be more infrared reflective or more absorptive compared to the surrounding background of the markings, i.e., the surface of the selected element(s) on which the markings are painted. As such, when the selected infrared reflective paint material(s) is more infrared reflective, the driving assistance markings will reflect more infrared light compared to their surrounding background and will be thus visible in the infrared spectrum range. Never the less, when the selected infrared reflective paint material(s) is more infrared absorptive (less infrared reflective), the driving assistance markings will reflect less infrared light compared to their surrounding background and will be also visible in the infrared spectrum range.

For example, assuming the road markings engine 220 selects a certain black asphalt road surface section of the road segment for applying the driving assistance markings. Further assuming that while the black asphalt road surface does not significantly reflect light in the visible light spectral range, the black asphalt road surface reflects infrared light in a spectral range of, for example, less than 800 nm. In such case the road markings engine 220 may select a paint material which does not deviate from the black asphalt color by more than, for example, 20% meaning that it does not reflect more than 20% of the visible light while significantly deviating, for example, by 25% from black asphalt color in the infrared spectral range, meaning that it reflects infrared light in a range of more than 1000 nm for example.

In another example, assuming the road markings engine 220 selects a certain white road marking of the road segment for applying the driving assistance markings. Further assuming that while the white road marking reflects most and possible all light in the visible light spectral range, the white road marking reflects infrared light in a spectral range of, for example, less than 950 nm. In such case the road markings engine 220 may select a paint material which does not deviate from the white road marking by more than, for example, 20% meaning that it reflects more that 80% of the visible light while significantly deviating, for example, by 25% from white road marking in the infrared spectral range, meaning that it reflects infrared light in a range of more than 1200 nm for example.

Figure 4:
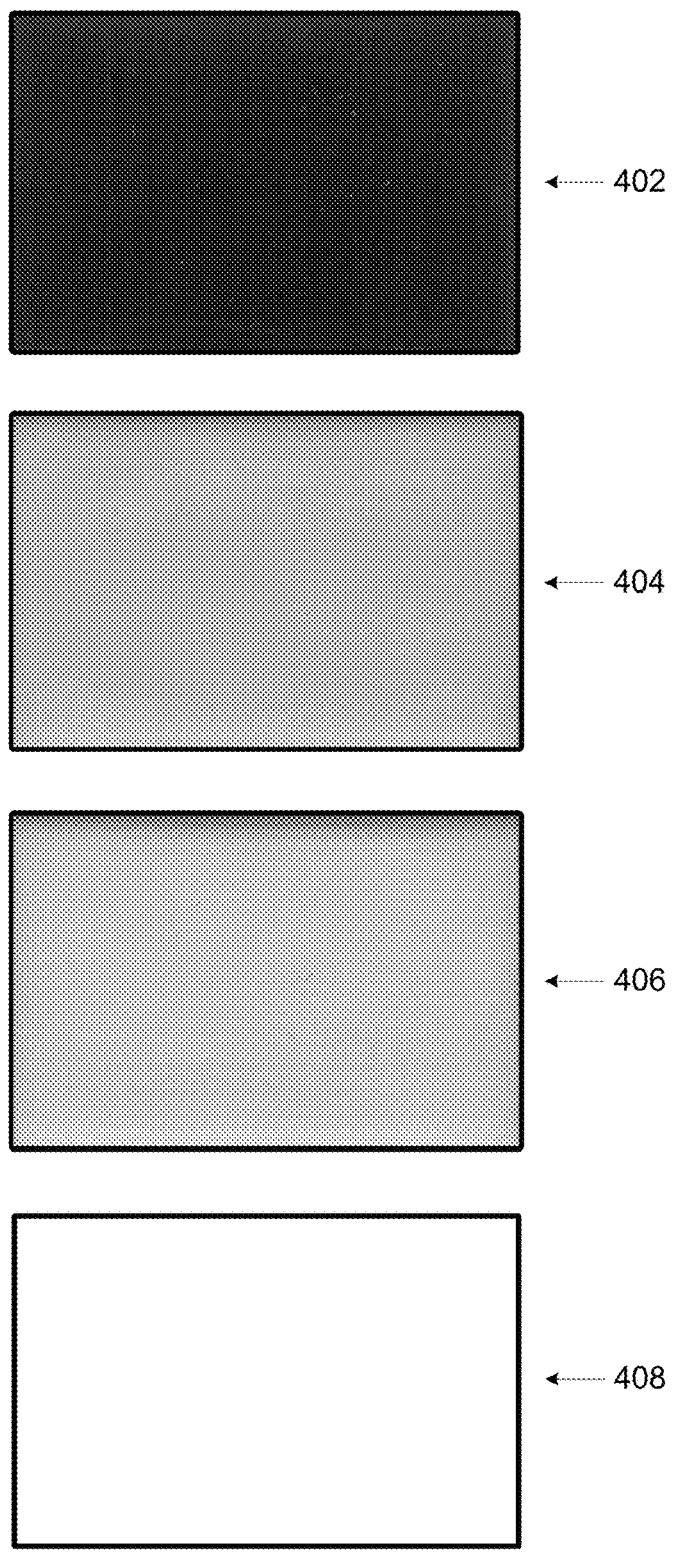
FIG. 4 presents color blends of an exemplary infrared reflective paint material(s) visible in the infrared spectrum while imperceptible in the visible light spectrum used for painting imperceptible driving assistance markings, according to some embodiments of the present invention.

Reference is now made to FIG. 4, presents color blends (mixtures) of an exemplary infrared reflective paint material(s) visible in the infrared spectrum while imperceptible in the visible light spectrum used for painting driving assistance markings, according to some embodiments of the present invention.

Assuming a road markings engine such as the road markings engine 220 selects a certain infrared reflective paint material seen in 402 which is characterized by a significantly dark color for painting driving assistance markings generated for a certain road segment. Further assuming the road markings engine 220 selects to paint the driving assistance markings on a certain element of the certain road segment which is characterized by a white color as seen in 408. In such case, the road markings engine 220 may determine that the certain infrared reflective paint material should be mixed with one or more other paint materials, for example, a white paint material to ensure that the certain infrared reflective paint material does not deviate from the color of the certain element painted white by more than the first value (e.g., 20%). The road markings engine 220 may compute one or more mixture ratios for mixing the certain infrared reflective paint material such that the color of the mixed infrared reflective paint material does not deviate by more than the first value form the white color of the surface of the certain element. A mixture at a ratio of 1:4 between the certain infrared reflective paint material and the white paint material is seen in 404 and a mixture at a ratio of 1:9 between the certain infrared reflective paint material and the white paint material is seen in 406.

As shown at 112, the road markings engine 220 may compute instructions for painting the driving assistance markings generated for the road segment on the selected element(s) using the selected paint material(s).

For example, the painting instructions may indicate a location, a position, an orientation, an elevation and/or the like for painting the driving assistance markings on the selected element(s). In another example, the painting instructions may indicate a size, a spacing and/or the like of the painted driving assistance markings.

Moreover, the painting instructions may define mixing one or more of the selected inferred reflective paint materials with one or more other paint materials and/or dilution substances to achieve and comply with the two characteristics of the paint material used to paint the driving assistance markings. Namely, these two characteristics, as described herein before, are deviation of less than the first value (e.g., 20%) from the visible light spectral range reflected by the surface of the respective element and deviation of more than the second value (e.g., 25%) from the infrared spectral range reflected by the surface of the respective element. The painting instructions may therefore define a concentration of each of the paint materials in the mixture, a volume of each paint materials in the mixture, one or more dilution materials and/or the like.

Optionally, the road markings engine 220 computes instructions for painting one or more of the driving assistance markings on the selected element(s) in close proximity, specifically closely around one or more visible road markings, for example, lane separator markings, road side border line markings, pedestrian crossings, painted direction symbols (e.g., arrows, stop lines, etc.), painted text (e.g. stop, slow, etc.) and/or the like. For example, the road markings engine 220 may compute instructions for painting one or more of the driving assistance markings next to lane separator lines markings. In another example, the road markings engine 220 may compute instructions for painting one or more of the driving assistance markings around one or more direction arrow markings. Painting the infrared visible driving assistance markings in proximity to the visible road markings may enable the automated vehicular systems to more easily detect, identify and/or recognize the infrared visible driving assistance markings. In particular, since the infrared visible driving assistance markings are located in proximity to the visible road markings, the automated vehicular systems may not erroneously interpret arbitrary infrared reflective materials and/or sections of the road segment as the infrared visible driving assistance markings.

The road markings engine 220 may compute the instructions for painting the driving assistance markings using the infrared reflective paint material(s) on existing painted surfaces of the selected element(s) of the road segment. For example, assuming there are lane separator line markings painted in at least part of the road segment, the road markings engine 220 may compute the instructions for painting the driving assistance markings using the infrared reflective paint material(s) on the existing lane separator line markings and/or part thereof. In another example, assuming there are one or more painted traffic poles and/or traffic light poles in the road segment, the road markings engine 220 may compute the instructions for painting the driving assistance markings using the infrared reflective paint material(s) on one or more of the painted poles.

However, the road markings engine 220 may compute the instructions for painting the driving assistance markings using the infrared reflective paint material(s) in conjunction with one or more other paint materials used to paint the surface(s) of the selected element(s). For example, the road markings engine 220 may compute instructions for painting one or more visible road markings, for example, lane operator lines, pedestrian crossing, direction symbols and/or the like using one or more visible light paint materials, for example, white paint. The road markings engine 220 may further compute instructions for using the infrared reflective paint material(s) to paint the driving assistance markings over one or more of the newly painted white road markings. In another example, the road markings engine 220 may compute instructions for painting one or more traffic poles located in the road segment using one or more visible light paint materials, for example, gray paint. The road markings engine 220 may further compute instructions for using the infrared reflective paint material(s) to paint the driving assistance markings over the one or more of the newly painted poles.

As shown at 114, the road markings engine 220 may output the painting instructions computed for painting the driving assistance markings on one or more of the elements of the road segment using one or more of the infrared visible paint materials The road markings engine 220 may output the painting instructions in one or more formats. For example, the painting instructions may be generated and configured accordingly to instruct one or more workers to manually apply the infrared visible paint(s). In another example, the painting instructions may be directed and configured accordingly for one or more automated painting systems, apparatuses and/or devices configured to apply automatically the infrared visible paint(s) to paint.

Figure 5:
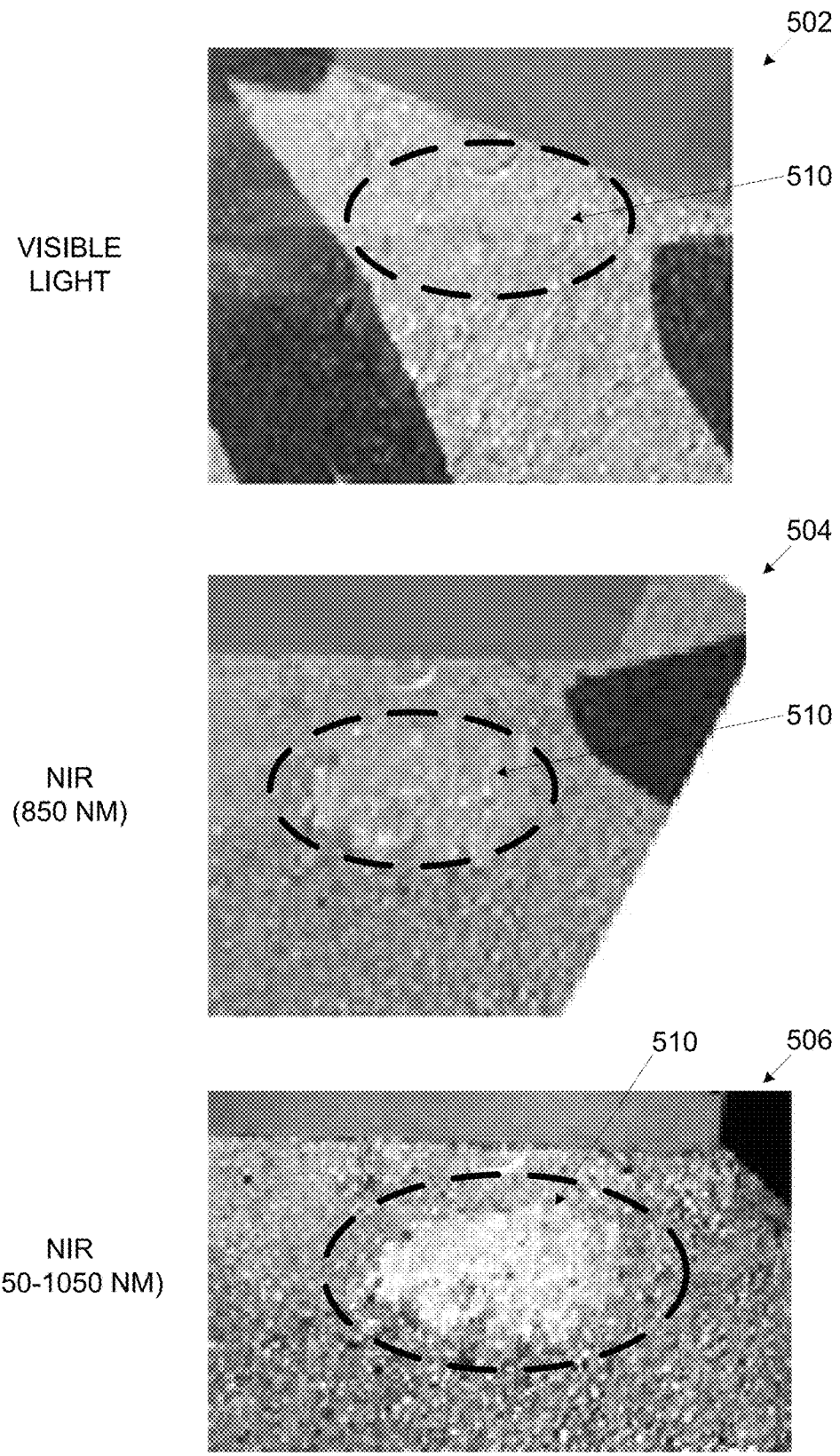
FIG. 5 presents images of a road section painted with an exemplary paint material(s) visible in the infrared spectrum while imperceptible in the visible light spectrum used for painting driving assistance markings, according to some embodiments of the present invention.

Reference is now made to FIG. 5, which presents images of a road section painted with an exemplary paint material(s) visible in the infrared spectrum while imperceptible in the visible light spectrum used for painting driving assistance markings, according to some embodiments of the present invention.

As seen in 502 which is an image of an exemplary certain road section captured in visible light spectral range, a certain mark 510 is almost imperceptible since it is painted using an exemplary infrared reflective paint material which does not significantly deviate from the color (visible light spectral range) of the certain road section.

As seen in 504, which is an image of the certain road section captured in NIR infrared spectral range, specifically at 850 nm, the certain mark 510 is slightly more visible since the exemplary infrared reflective paint material deviates to some extent from the infrared spectral range of the certain road section. However, the deviation may be insufficient, i.e., less than the second value (e.g. 25%) such that it may be significantly difficult to distinguish the certain mark 510 from its surrounding road section even in the 850 nm spectral range.

As seen in 506, which is an image of the certain road section captured in higher NIR infrared spectral range, specifically at 850-1050 nm, the certain mark 510 is highly visible since the exemplary infrared reflective paint material significantly deviates from the infrared spectral range of the certain road section, specifically by more than the second value (e.g. 25%).

According to some embodiments of the present invention the road markings generation system 200, specifically the road markings engine 220 may be integrated and/or executed by one or more painting systems, apparatuses and/or devices configured to apply automatically one or more of the infrared reflective paint materials for painting the infrared visible driving assistance markings on one or more elements in one or more road segments.

Such painting systems, apparatuses and/or devices, collectively designated automated painting systems herein after, may be equipped with one or more paint applying elements as known in the art, for example, a sprayer, a brush, a dispenser and/or the like which are controllable by one or more controllers and/or processors of the automated painting systems.

The road markings engine 220 executed by one or more of the automated painting systems may therefore execute the process 100 to compute the instructions for painting the driving assistance markings generated for one or more road segments on one or more elements of the respective road segments using one or more of the infrared reflective paint materials.

Specifically, one or more of the automated painting systems may be equipped with one or more imaging sensors, for example, a camera, infrared camera, a thermal camera and/or the like configured to capture one or more images of the road segment(s) in particular of one or more of the elements of the road segment(s). The road markings engine 220 may analyze the images, specifically the elements' surface(s) to identify their color and select the infrared reflective paint material(s) accordingly as described in the process 100.

After computing the painting instructions, the road markings engine 220 may operate one or more of the paint applying elements of the respective automated paining system to automatically apply the infrared reflective paint materials in order to paint the infrared visible driving assistance markings. In other embodiments, the road markings engine 220 may provide the painting instructions to one or more other functional modules (e.g. software module, hardware element and/or a combination thereof) executed by the automated painting system.

Optionally, one or more of the automated paining systems may be further configured to apply visible paint to paint road markings using one or more visible paint materials which are visible in the visible light spectrum. Such automated paining systems may optionally paint the infrared visible driving assistance markings using the selected infrared reflective paint material(s) while painting the visible road markings using the visible paint material(s).

According to some embodiments of the present invention, the road markings generation system 200, specifically the road markings engine 220 may be configured to compute instructions for painting, in one or more road segments, driving assistance markings which are highly visible in a plurality of spectral ranges, specifically in the visible light spectral range and in one or more infrared light spectral ranges, for example NIR, SWIR and/or the like.

The road markings engine 220 may execute a process similar to the process 100 with the following adjustments. First, in step 110, the road markings engine 220 may select one or more paint materials which reflect light deviating, in a plurality of light spectral ranges, from the light reflected by the surface(s) of the element(s) selected for painting the driving assistance markings. In addition, in step 112, the road markings engine 220 may compute the painting instructions accordingly based on the selected paint material(s) and the selected element(s) on which the driving assistance markings should be painted.

As describe in the process 100, in step 102, the road markings engine 220 may receive one or more images of the road segment.

In step 104, the road markings engine 220 may generate driving assistance markings for the road segment. For example, the road markings engine 220 may generate the driving assistance markings based on analysis of the image(s) of the road segment. In another example, the road markings engine 220 may optionally generate the driving assistance markings according to one or more instructions received from one or more users and/or automated systems adapted to generate driving assistance markings.

In step 106, the road markings engine 220 may analyze the image(s) of the road segment to identify and select one or more of the elements of the road segment suitable for applying (painting) the driving assistance markings generated for the road segment, for example, a section of the road segment, a traffic sign, a traffic light and/or the like.

In step 108, the road markings engine 220 may analyze one or more of the surfaces of one or more of the selected element(s) on which the driving assistance markings generated for the road segment are to be painted. In particular, the road markings engine 220 may analyze the image(s) of the road segment to identify a color of the surface(s) of the selected element(s) and more specifically to identify the spectral range of visible light reflected by the surface(s) of the selected element(s).

In step 110, the road markings engine 220 may select one or more paint materials for applying (painting) the driving assistance markings generated for the road segment on the selected element(s) of the road segment.

The computed driving assistance markings are directed to support one or more of the automated vehicular systems which are capable of operating in the infrared spectrum, in particular, automated vehicular systems which integrate, employ, connect and/or communicate with one or more of the imaging sensors adapted to operate in the infrared spectral range, for example, NIR, SWIR and/or the like.

The road markings engine 220 may therefore select paint material(s) which reflect (or absorb) infrared light in one or more infrared spectral ranges, for example, NIR, SWIR and/or the like. However, while the selected paint material(s) are characterized by reflecting significant light in the infrared light spectral range(s), these paint material(s) must also reflect light in the visible light range which significantly deviates from the light reflected by the surfaces(s) of the element(s) selected for painting the driving assistance markings.

This means that the selected paint material(s) are characterized by reflecting light which deviates, in a plurality of spectral ranges, by more than a certain value, for example, 15%. 20%, 25% and/or the like from the light reflected by the surface(s) of the selected element(s) where the plurality of spectral ranges may include, for example, the visible light range, NIR, SWIR and/or the like.

For example, assuming one or more sections of the road segment are selected for painting the driving assistance markings, for example, direction arrows, separation lines, lane markings and/or the like. In such case, the road markings engine 220 may select one or more paint materials which reflect light deviating by more than the certain value form the light reflected by the road segment in at least some of the plurality of light spectral ranges. In another example, since the surface of the road segment may typically be black, the road markings engine 220 may select a certain paint material which reflects visible light in a spectral range different from the black color, for example, in a spectral range corresponding to white color, yellow color and/or the like. The certain paint material may be further selected to reflect light in one or more of the infrared spectral ranges which deviates by more than the certain value from the light reflected by the road surface in the respective infrared spectral range(s).

In another example, assuming the road markings engine 220 selects a certain traffic sign for painting the driving assistance markings, specifically driving assistance markings which are traditionally painted on the certain traffic sign, for example, a stop sign, an intersection ahead sign, a left curve sign and/or the like. Further assuming the certain traffic sign includes a white background and one or more red sections. In such case, the road markings engine 220 may select one or more paint materials which reflect light deviating by more than the certain value form the light reflected by the white background of the certain traffic sign. Specifically, the road markings engine 220 may select infrared reflective paint material(s) which in the visible light spectral range reflect light in a range corresponding to the red color, for example, 600 nm. The certain paint material may be further selected by the road markings engine 220 to reflect light in one or more of the infrared spectral ranges which deviates by more than the certain value from the light reflected by the white background of the certain traffic sign in the respective infrared spectral range(s).

In another example, assuming the road markings engine 220 selects the paint the painting the driving assistance markings on a certain traffic sign comprising a white background and one or more blue sections. In such case, the road markings engine 220 may select one or more paint materials which reflect light deviating by more than the certain value form the light reflected by the white background of the certain traffic sign. Specifically, the road markings engine 220 may select paint material(s) which in the visible light spectral range reflect light in a range corresponding to the blue color, for example, 440 nm. The certain paint material may be further selected by the road markings engine 220 to reflect light in one or more of the infrared spectral ranges which deviates by more than the certain value from the light reflected by the white background of the certain traffic sign in the respective infrared spectral range(s).

As stated herein before, for brevity the paint material(s) selected for painting the driving assistance markings are designated infrared reflective paint materials. However, the deviation in the reflectance of infrared light may be to both directions, meaning that the paint material(s) selected for painting the driving assistance markings may be more infrared reflective or more absorptive compared to the surrounding background of the markings, i.e., the surface of the selected element(s) on which the markings are painted.

Figure 6A:
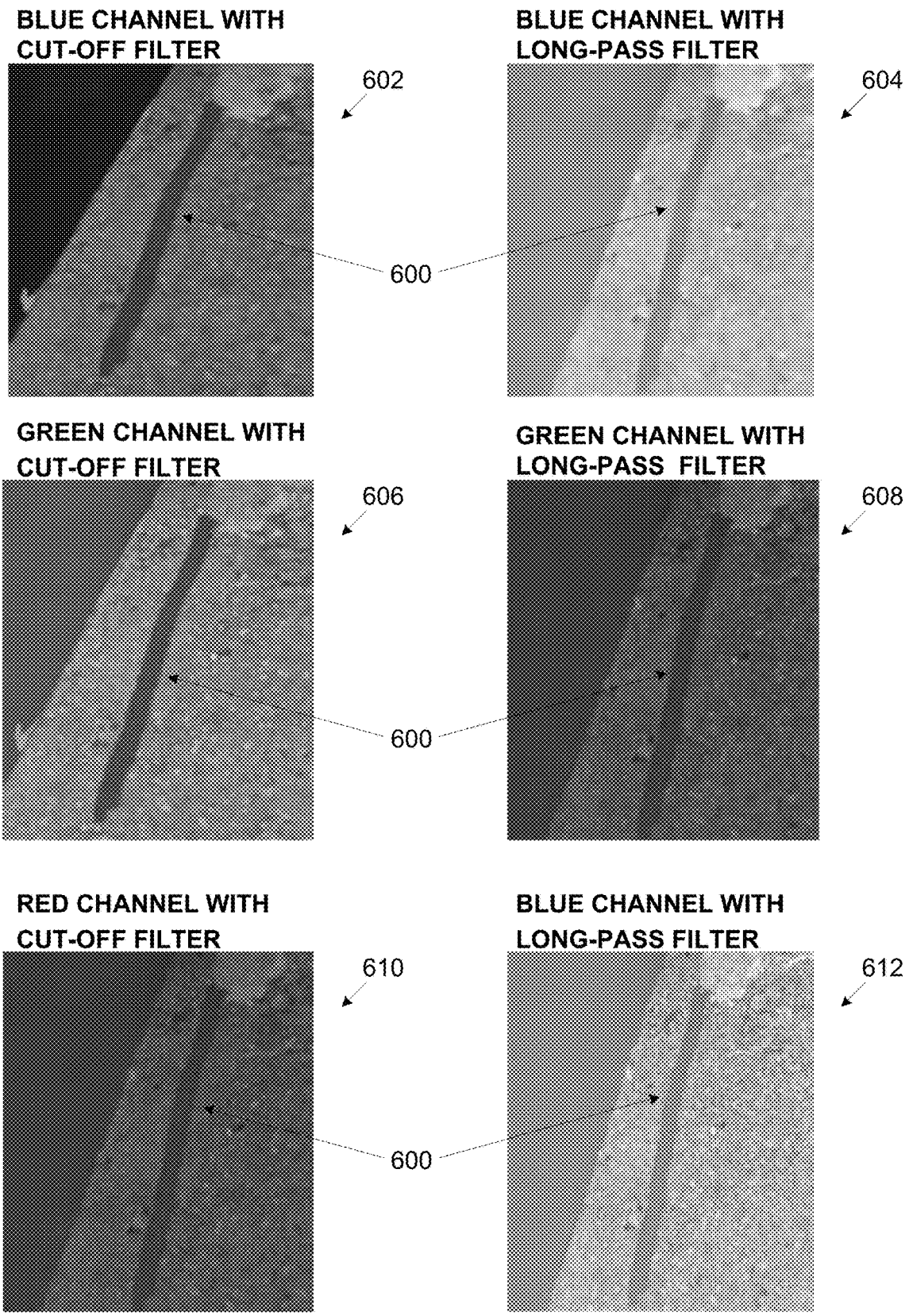
FIG. 6A and FIG. 6B present images of paint materials used for painting driving assistance markings which are characterized by reflecting light significantly deviating from background light reflection in both visible light spectral range and in NIR spectral range, according to some embodiments of the present invention.
Figure 6B:
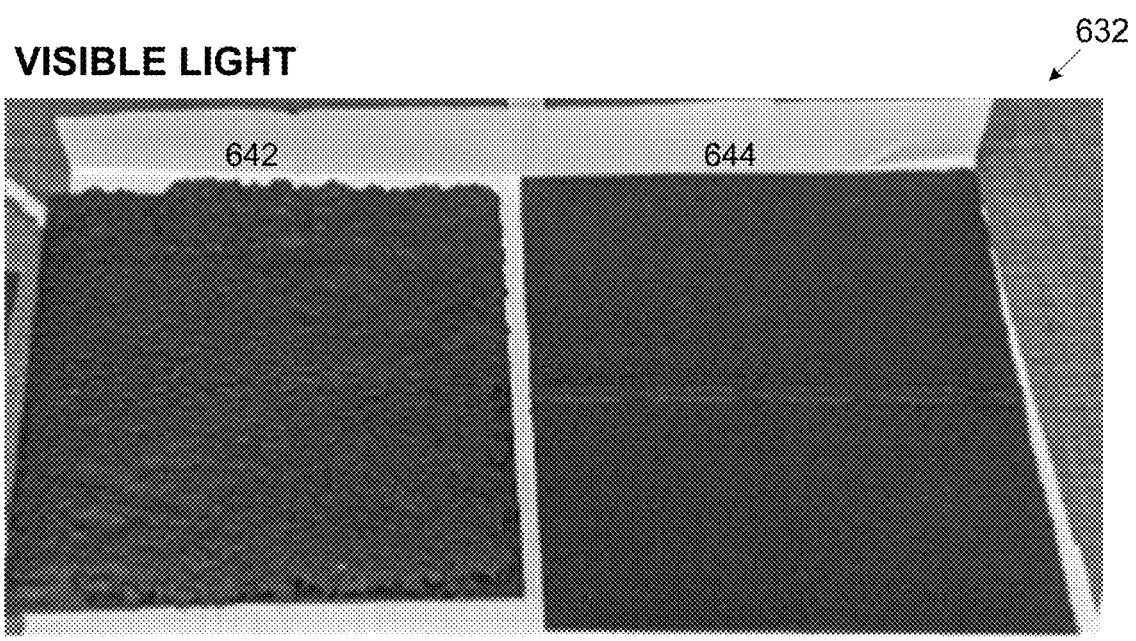
Figure 6B:
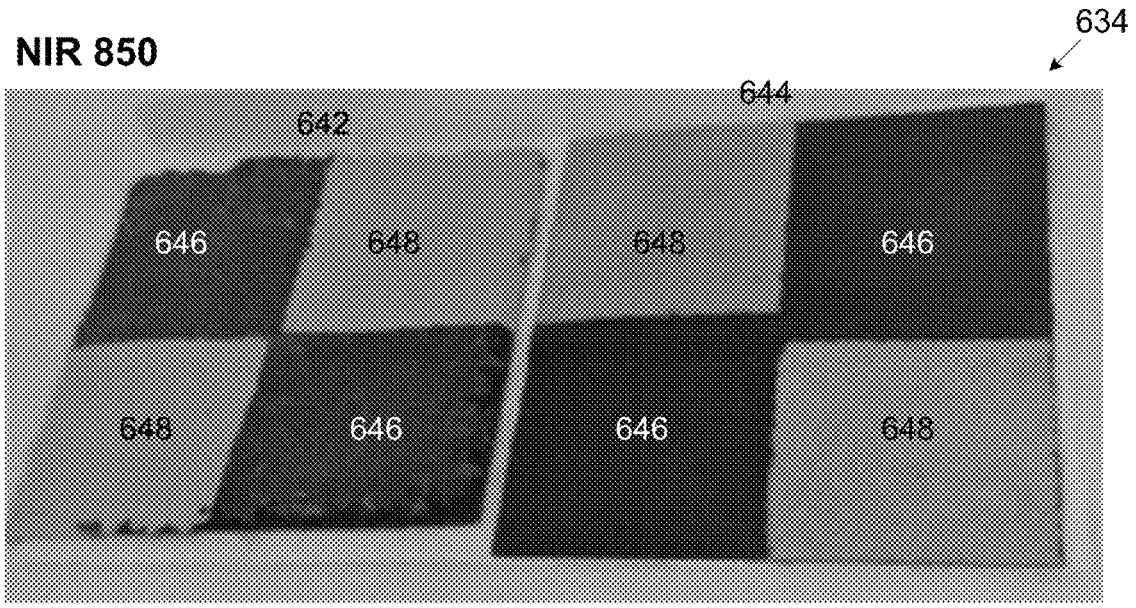

Reference is now made to FIG. 6A and FIG. 6B, which present images of paint materials used for painting driving assistance markings which are characterized by reflecting light significantly deviating from background light reflection in both visible light spectral range and in NIR spectral range, according to some embodiments of the present invention.

Images 602, 604, 606, 608, 610 and 612 show a line 600 painted on a certain surface, specifically a road surface using an infrared reflective paint material characterized by reflecting light in both the visible light spectral range and in the NIR spectral range.

As seen in image 602, which presents a blue channel (440 nm) of the captured image applied with an NIR cut-off filter configured to attenuate wavelengths in the NIR spectral range, the line 600 is clearly distinguishable from the road surface and may be easily identified. Moreover, as seen in image 604, which presents the blue channel of the captured image applied with a long-pass filter configured to attenuate wavelengths in the visible light spectral range and pass wavelength in the NIR spectral range (e.g. 850 nm), the line 600 is also clearly distinguishable from the road surface and may be easily identified.

As seen in image 606, which presents a green channel (533 nm) of the captured image applied with the NIR cut-off filter, the line 600 is clearly distinguishable from the road surface and may be easily identified. Moreover, as seen in image 608, which presents the blue channel of the captured image applied with a long-pass filter, the line 600 is also clearly distinguishable from the road surface and may be easily identified.

As seen in image 610, which presents a red channel (600 nm) of the captured image applied with the NIR cut-off filter, while less distinguishable compared to the blue and green channels depicted in images 602 and 606, the line 600 is still distinguishable from the road surface and may be identified. However, as seen in image 610, which presents the red channel of the captured image applied with a long-pass filter, the line 600 is very clear and distinguishable from the road surface and may be therefore easily identified.

Images 632 and 634 show a first element 642 and a second element 644 painted using a fourth infrared reflective paint material 646 and a fifth infrared reflective paint material 648. As seen in image 632, in the visible light spectral range, both the fourth and fifth infrared reflective paint material 646 and 648 reflect light corresponding to substantially the same color, specifically black color. However, as seen in image 634, presenting the first and second elements 642 and 644 in the NIR spectral range (850 nm), the fourth and fifth infrared reflective paint material 646 and 648 reflect very different light levels in the NIR spectral range.

This demonstrates how different infrared reflective paint materials may be selected according to the light reflectance characteristics, attributes and/or parameters of the background surface selected for painting the on which the driving assistance markings.

In step 112, the road markings engine 220 may compute instructions for painting the driving assistance markings generated for the road segment on the selected element(s) using the selected paint material(s).

Painted using the infrared reflective paint material(s), the driving assistance markings may be therefore visible in the plurality of spectral ranges, for example, the visible light spectrum and/or one or more of the infrared spectral ranges. In particular, the driving assistance markings may appear similar and typically identical in the plurality of spectral ranges.

As described herein before, the road markings engine 220 may compute the instructions for painting the driving assistance markings using the infrared reflective paint material(s) on existing painted surfaces of the selected element(s) of the road segment. However, as also described herein before, the road markings engine 220 may compute the instructions for painting the driving assistance markings using the infrared reflective paint material(s) over one or more unpainted surfaces of one or more elements of the road segment. Moreover, the road markings engine 220 may compute the instructions for painting the driving assistance markings on one or more elements, for example, a traffic sign and/or the like which is not yet deployed in the road segment. After painted with the driving assistance markings using the selected infrared reflective paint material(s), the painted elements may be deployed at appropriate location(s) in the road segment.

In step 114, the road markings engine 220 may output the painting instructions computed for painting the driving assistance markings on one or more of the elements of the road segment using one or more of the infrared visible paint materials According to some embodiments of the present invention, one or more of the automated vehicular systems may be configured to detect and identify the driving assistance markings in at least some of the plurality of light spectral ranges.

One or more of the automated vehicular systems may be configured to identify the driving assistance markings and/or part thereof in at least some of the plurality of spectral ranges. The automated vehicular system(s) may be further configured to aggregate the driving assistance markings detected across the multiple spectral ranges.

Figure 7:
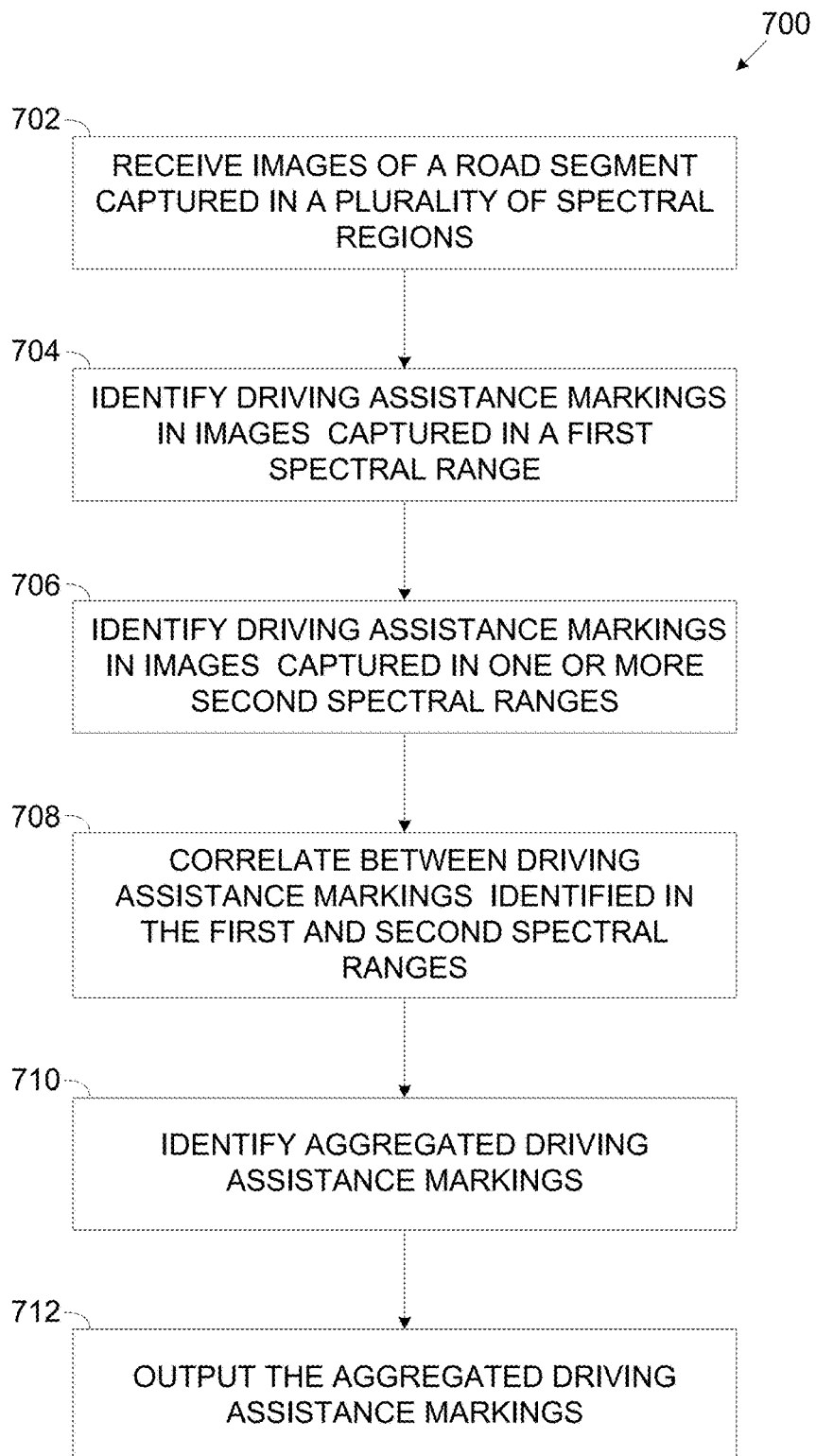
FIG. 7 is a flowchart of an exemplary process of detecting driving assistance marking painted using paint material(s) visible in a plurality of spectral ranges, according to some embodiments of the present invention.
Figure 8:
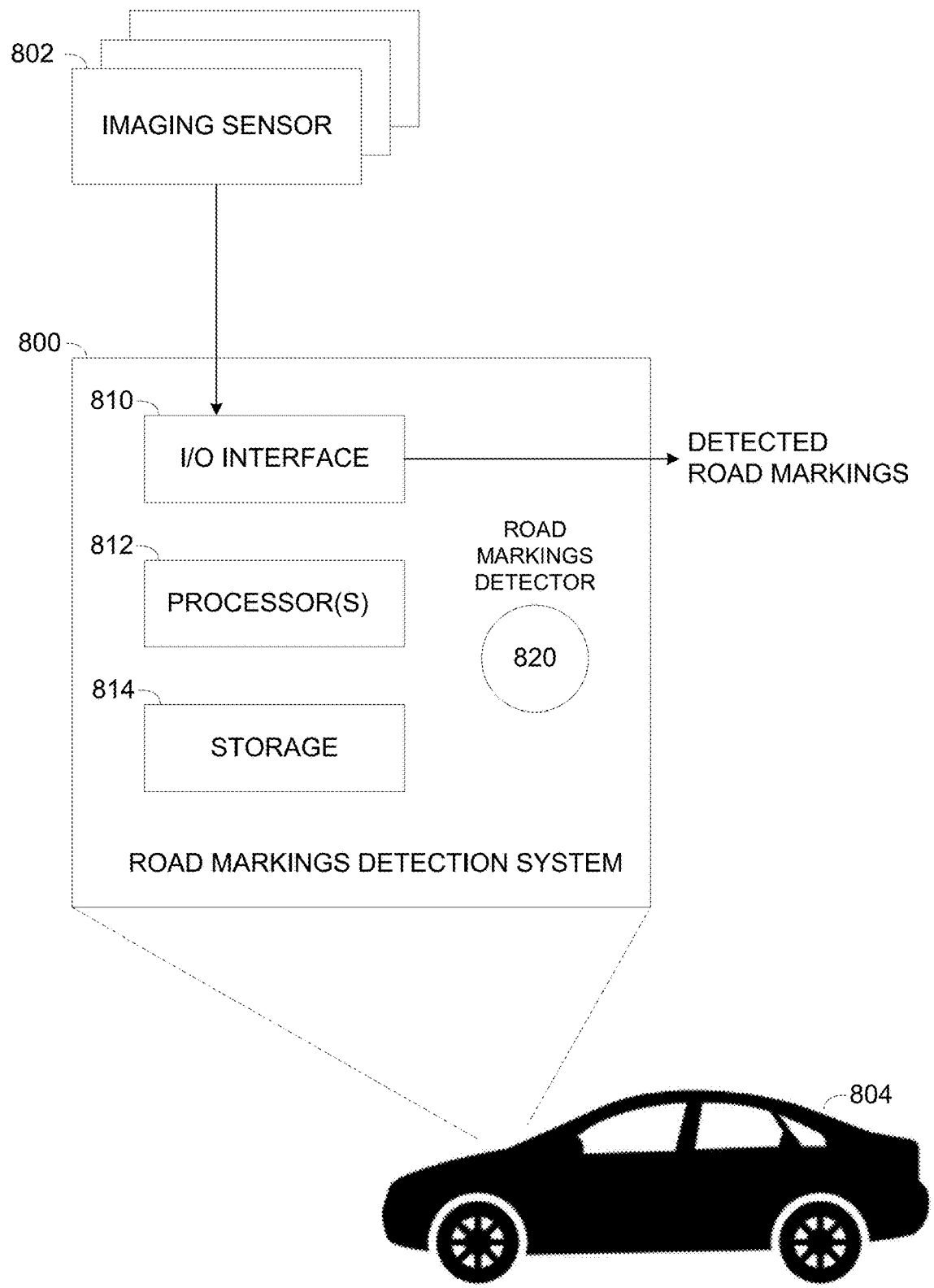
FIG. 8 is a schematic illustration of an exemplary system for detecting driving assistance marking painted using paint material(s) visible in a plurality of spectral ranges, according to some embodiments of the present invention.

Reference is now made to FIG. 7, which is a flowchart of an exemplary process of detecting driving assistance marking painted using paint material(s) visible in a plurality of spectral ranges, according to some embodiments of the present invention. Reference is also made to FIG. 8, which is a schematic illustration of an exemplary system for detecting driving assistance marking painted using paint material(s) visible in a plurality of spectral ranges, according to some embodiments of the present invention;

One or more road marking detection system, device, apparatus and/or the like which are collectively designated road marking detection system 800 may be installed, mounted, integrated and/or otherwise coupled to a vehicle 804, for example, a car, a truck, a motorcycle, a train, a bicycle, etc. to execute an exemplary process 700. The process 700 may be executed to detect driving assistance marking in a plurality of spectral ranges, for example, visible light spectral range, infrared spectral range (e.g. NIR, SWIR) and/or the like and aggregate the driving assistance marking detected across the multiple spectral ranges to identify aggregated driving assistance marking which may be significantly more visible, complete, accurate, reliable and/or robust compared to the driving assistance marking detected in any single spectral range.

The road marking detection system 800 may include an I/O interface 810 such as the I/O interface 210, a processor(s) 812 such as the processor(s) 212 for executing the process 700 and a storage such as the storage 214 for storing data and/or code (program store).

Via the I/O 210 interface comprising one or more network interfaces and/or interconnection interfaces, the road marking detection system 800 may connect and/or communicate with one or more other systems, devices and/or services which may be local at the vehicle 804 and/or remote, for example, a remote server, a cloud service, a cloud platform and/or the like.

Specifically, via the I/O interface, the road marking detection system 800 may communicate with one or more imagining sensors 802 installed, mounted, integrated and/or otherwise coupled to a vehicle 804 which are deployed and configured to monitor and capture images of the external environment of the vehicle 804. The imaging sensors 802 may include, for example, the camera, the infrared camera, the thermal mapping camera and/or the like configured to capture images of the vehicle's surroundings in a plurality of spectral ranges, for example, visible light spectrum, NIR spectrum, SWIR spectrum and/or the like.

Each of the imaging sensor(s) 802 may be configured to operate in one or more of the plurality of spectral ranges and capture images in the respective spectral range(s). For example, one or more of the imaging sensor(s) 802 may be configured to operate in a single one of the spectral ranges, for example, only in the visible light range, only in NIR range, only in SWIR range and/or the like. However, one or more of the imaging sensor(s) 802 may be configured to operate in multiple spectral ranges, for example, in the visible light range and in the NIR range, in the visible light range and in the SWIR range, in the visible light range and in the NIR range and in the SWIR range and/or the like.

The processor(s) 812 may execute one or more software modules such as, for example, a process, a script, an application, an agent, a utility, a tool, an OS and/or the like each comprising a plurality of program instructions stored in a non-transitory medium (program store) such as the storage 814 and executed by one or more processors such as the processor(s) 812. The processor(s) 812 may optionally, integrate, utilize and/or facilitate one or more hardware elements (modules) integrated and/or utilized in the road markings generation system 200, for example, a circuit, a component, an IC, an ASIC, an FPGA, a DSP, a GPU and/or the like.

The processor(s) 812 may therefore execute one or more functional modules implemented using one or more software modules, one or more of the hardware modules and/or combination thereof. For example, the processor(s) 812 may execute a road markings detector 820 functional module for executing the process 700 to detect driving assistance markings in a plurality of spectral ranges and aggregate them to improve detection of the driving assistance markings.

As shown at 702, the road marking detection system 800, specifically the road markings detector 820 may receive from the imaging sensor(s) 802 a plurality of images depicting the external environment of the vehicle 804.

In particular, the images captured by the imaging sensor(s) 802 may depict driving assistance markings present around the vehicle 804. Moreover, since the imaging sensor(s) 802 are configured to operate in the plurality of spectral ranges, the received images may depict the driving assistance markings and/or part thereof in at least some different spectral ranges.

As shown at 704, the road markings detector 820 may analyze the images to identify the driving assistance markings and/or part thereof in the at least some different spectral ranges. In particular, the road markings detector 820 may analyze one or more first images captured in a first spectral range to identify the driving assistance markings and/or part thereof in the first spectral range.

As shown at 706, the road markings detector 820 may further analyze additional images, in particular one or more second images captured in one or more second spectral ranges different from the first spectral range to identify the driving assistance markings and/or part thereof in the second spectral range(s).

In order to detect and/or identify the driving assistance markings in the images captured in the first and second spectral ranges, the road markings detector 820 may apply one or more technologies, methods, techniques and/or algorithms as known in the art, for example, a classifier, a neural network, a support Vector Machine (SVM), a computer vision analysis tool, an image processing algorithm and/or the like configured to analyze visual data and identify patterns.

For example, the road markings detector 820 may apply one or more clustering algorithms configured to segment the images and cluster together pixels associated respective element(s). Optionally, the road markings detector 820 may apply one or more smoothing and/or averaging functions and/or algorithms to filter out pixels which do not comply with one or more thresholds and are therefore predicted not to be part of the driving assistance markings. Optionally, the road markings detector 820 may apply one or more erosion and/or dilation operators to the segmented images.

In another example, the road markings detector 820 may apply one or more edge detection algorithm algorithms configured to detect an outline of one or more elements deleted in the images.

Analyzing the images depicting the driving assistance markings in the first spectral range and one or more of the second spectral ranges, the road markings detector 820 may therefore identify the driving assistance markings and/or part thereof in multiple different spectral ranges. For example, assuming the first spectral range is the visible light range and the second spectral range is the NIR spectral range, the road markings detector 820 may identify the driving assistance markings and/or part thereof in both the visible light and the NIR spectral ranges. In another example, assuming the first spectral range is the visible light range and the second spectral range is the SWIR spectral range, the road markings detector 820 may identify the driving assistance markings and/or part thereof in both the visible light and the SWIR spectral ranges. In another example, assuming the first spectral range is the visible light range and the second spectral range includes both the NIR and SWIR spectral ranges, the road markings detector 820 may identify the driving assistance markings and/or part thereof in the visible light, the NIR and the SWIR spectral ranges. In another example, assuming the first spectral range is the NIR spectral range and the second spectral range is the SWIR spectral range, the road markings detector 820 may identify the driving assistance markings and/or part thereof in both the NIT and the SWIR spectral ranges.

As shown at 708, the road markings detector 820 may correlate between the driving assistance markings and/or part thereof identified in the first and second spectral ranges.

The road markings detector 820 may first register the images captured in the first and second spectral ranges to establish a common reference between the images. To this end, the road markings detector 820 may apply one or more methods and/or techniques as known in the art to register the images depicting the driving assistance markings in the first and second spectral ranges, for example, align the images, bring the images into a common coordinate system and/or the like.

For example, assuming the received images are captured in the different spectral ranges by a certain single imaging sensor 802 configured to operate in multiple spectral ranges. In such case, the operational parameters and/or mounting parameters of the certain imaging sensor 802, for example, positioning, orientation, field of view, zoom, resolution and/or the like may be known and optionally common to the images captured in the different spectral ranges and the road markings detector 820 may register the images accordingly. In another example, assuming the received images are captured in the different spectral ranges by several distinct single imaging sensors 802 each configured to operate in one or more of the spectral ranges. In such case, the road markings detector 820 may register the images received from the different imaging sensors 802 according to known operational parameters and/or mounting parameters of the plurality of imaging sensors 802.

After registering the images, the road markings detector 820 may correlate between the driving assistance markings and/or part thereof which are identified in the images captured in at least some of the different spectral ranges, specifically the first and second spectral ranges according to their location and/or position in the registered images.

For example, assuming the clustering algorithm(s) are applied to segment the images (steps 704 and 706), the road markings detector 820 may correlate between segments in the segmented images derived from the images captured in the first and second spectral ranges. Specifically, the road markings detector 820 may correlate between segments of the infrared reflective paint material(s) used to paint the driving assistance markings which are identified in the images. In another example, assuming the edge detection algorithm(s) are applied to outline elements detected in the images (steps 704 and 706), the road markings detector 820 may correlate between outlined elements detected in the images captured in the in the first and second spectral ranges, specifically edges and/or outline of the driving assistance markings painted using the infrared reflective paint material(s).

As shown at 710, the road markings detector 820 may aggregate the driving assistance markings detected across multiple spectral ranges, specifically the first and second spectral ranges to identify aggregated driving assistance markings.

For example, assuming the clustering algorithm(s) are applied to segment the images (steps 704 and 706) and segments are correlated together, specifically segments of the driving assistance markings painted using the infrared reflective paint material(s) (step 706), the road markings detector 820 may aggregate the correlated segments, for example, combine, overlap, add and/or the like to identify the aggregated driving assistance markings.

In another example, assuming the edge detection algorithm(s) are applied to outline elements detected in the images (steps 704 and 706) and outlined elements are correlated together (step 706), the road markings detector 820 may aggregate the correlated outlined element(s) segments, for example, combine, overlap, add and/or the like to identify the aggregated driving assistance markings.

The aggregated driving assistance markings combining and/or complementing the driving assistance markings identified separately in the first and second spectral ranges may be significantly more visible, complete, accurate, reliable and/or robust compared to the driving assistance marking detected in any single spectral range.

For example, in the visible light spectrum, background elements may often blend with the driving assistance markings such that they may become undistinguishable from the background. However, in the infrared spectral range(s) (e.g. NIR, SWIR, etc.), the driving assistance markings may be typically highly distinguishable from background elements. For example, assuming a certain colored traffic sign is located such that, from one or more viewpoints, the certain traffic sign may overlap with a colored commercial sign placed next to the road. In such case, the driving assistance markings printed on the certain traffic sign may not be easily identified, specifically by the automated vehicular system(s) based on visible light images of the certain traffic sign. However, in the infrared spectral range(s), the driving assistance markings printed on the certain traffic sign using the infrared reflective paint material(s) may be highly distinguishable from the commercial sign which may have completely different reflection characteristics in the infrared spectral range(s). The automated vehicular system(s) may therefore easily detect the driving assistance markings in the infrared spectral range(s).

As shown at 712, the road markings detector 820 may output the aggregated driving assistance markings which may be used by one or more automated vehicular systems of the vehicle 804 to control and/or maneuver the vehicle 804, for example, break, accelerate, decelerate, turn and/or the like. While the road markings detector 820 may provide the detected driving assistance markings in visual form, typically the road markings detector 820 may output an indication of the detected driving assistance markings describing them in terms and/or format that is recognizable and decodable by the automated vehicular system(s). Moreover, the road markings detector 820 may output additional information relating to the detected driving assistance markings, for example, a location, a position, a direction, a distance, a confidence score of correct detection (i.e. a probability score) and/or the like.

Figure 9A:
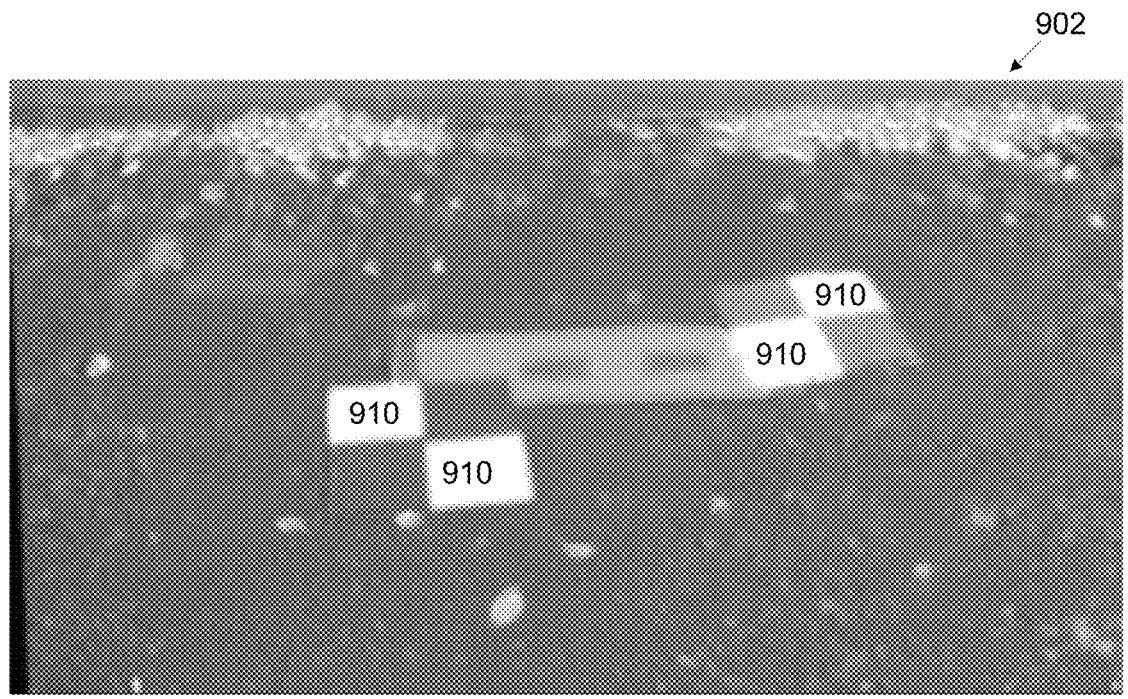
FIG. 9A and FIG. 9B present images produced in a segmentation process to identify aggregate driving assistance marking painted using paint material(s) visible in a plurality of spectral ranges, according to some embodiments of the present invention.
Figure 9A:
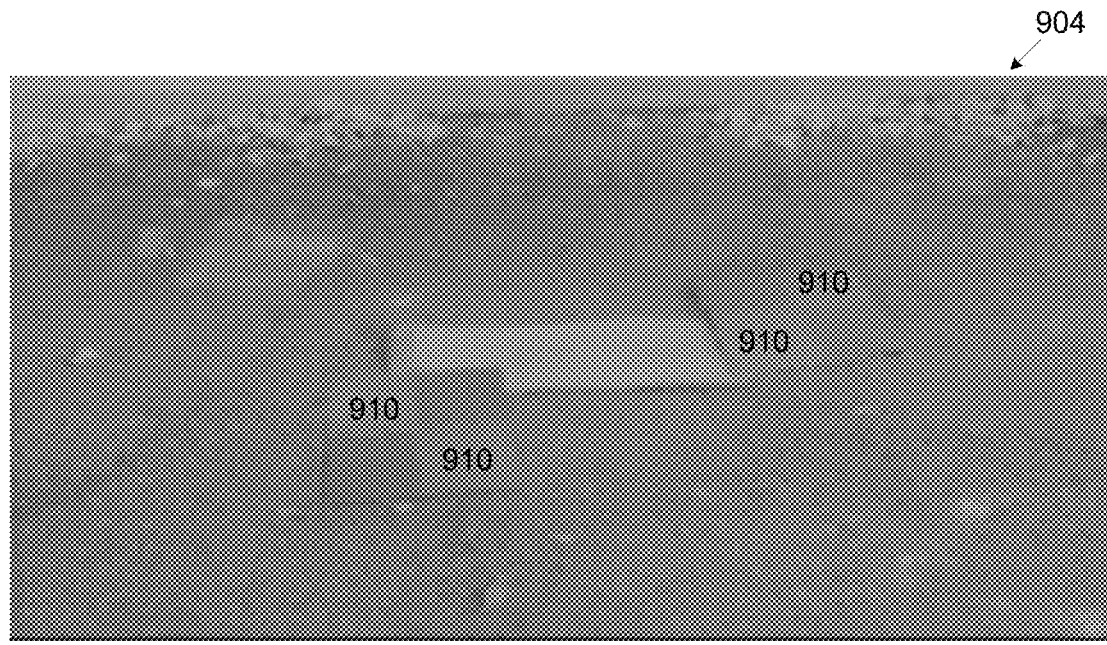
Figure 9B:
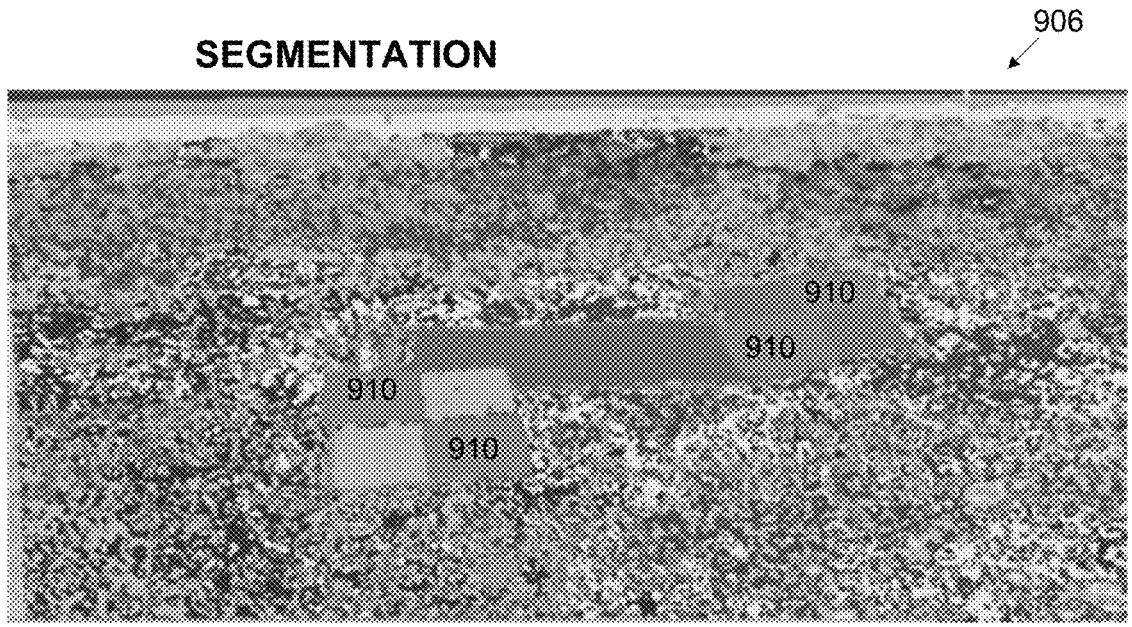
Figure 9B:
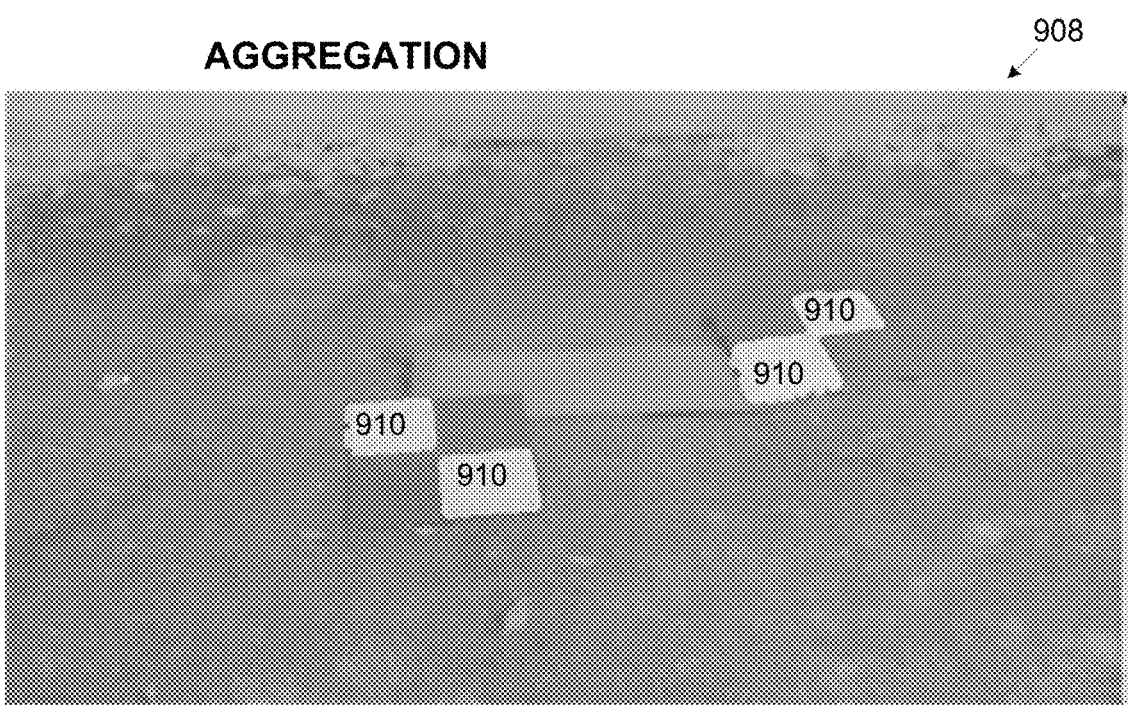

Reference is now made to FIG. 9A and FIG. 9B, which present images produced in a segmentation process to identify aggregate driving assistance marking painted using paint material(s) visible in a plurality of spectral ranges, according to some embodiments of the present invention.

An image 902 depicting a certain scene is captured by one or more imaging sensors such as the imaging sensor 802 in a visible light spectral range, specifically green color spectral range ~533 nm. As seen, a plurality of colored regions 910 painted using one or more of the infrared reflective paint materials are detected in the image 902.

An image 904 depicting the certain scene is captured by one or more imaging sensors such as the imaging sensor 802 in an infrared spectral range, specifically in NIR spectral range ~850 nm. As seen, the plurality of colored regions 910 painted using the infrared reflective paint material(s) are detected also in the image 904.

An image 906 presents an outcome of a segmentation process applied to the image 904 by a road markings detector such as the road markings detector 820 as described in step 704 of the process 700. As seen the colored regions 910 are segmented into respective segments of the image 906.

An image 908 presents an aggregated result of the correlated segmented elements of the image 906 and respective segmented image derived from the image 902. The aggregation of the segments may be done by the road markings detector 820 as described in step 708 of the process 700 to identify an aggregation of the colored regions 910. For example, the road markings detector 820 may select clusters (segments) with highest value of NIR/VIS and/or black clusters where the values of R, G, and B in the visible light spectrum are substantially equal. As evident, the aggregated colored regions 910 are significantly more emphasized, clear, complete and accurate in the image 908 compared to each of the originally captured images 902 and 904.

According to some embodiments of the present invention, the road markings generation system 200, specifically the road markings engine 220 may be configured to compute instructions for painting, in one or more road segments, enhanced driving assistance markings which are highly visible in the infrared light spectral range, for example NIR, SWIR and/or the like while highly imperceptible in the visible light spectrum.

The road markings engine 220 may execute a process similar to the process 100 with the following adjustments. First, in step 110, the road markings engine 220 may select one or more paint materials which are semi-transparent specifically paint material(s) which are highly transparent in one or more of the infrared spectral ranges while opaque in the visible light spectrum. In addition, in step 112, the road markings engine 220 may compute the painting instructions accordingly based on the selected paint material(s) and the selected element(s) on which the driving assistance markings should be painted.

As describe in the process 100, in step 102, the road markings engine 220 may receive one or more images of the road segment.

In step 104, the road markings engine 220 may generate enhanced driving assistance markings for the road segment. The road markings engine 220 may generate the driving assistance markings based on analysis of the image(s) of the road segment. However, optionally, the road markings engine 220 may generate the driving assistance markings according to one or more instructions received from one or more users and/or automated systems adapted to generate driving assistance markings.

The enhanced driving assistance markings may include additional information and/or data directed to support one or more of the automated vehicular systems and is not intended for use by human drivers. In particular, the enhanced driving assistance markings may include detailed, extensive and/or complex information that while providing highly detailed information relating to the road segment may overload human perception and may require significant processing resources beyond the capability of humans.

The enhanced driving assistance markings may include one or more parameters, attributes and/or characteristics of the road segment, for example, high precision location, detailed driving restrictions, detailed description of elements, elements and/or features of the road segment (e.g. road surface type, road physical dimensions, curves, curve sharpness, slop angle, etc.).

Optionally, the enhanced driving assistance markings may be encoded to further increase the capacity of information that may be expressed by them. The automated vehicular systems(s) may decode the encoded enhanced driving assistance markings to extract the information and data embedded in them.

In step 106, the road markings engine 220 may analyze the image(s) of the road segment to identify and select one or more of the elements of the road segment suitable for applying (painting) the driving assistance markings generated for the road segment, for example, a section of the road segment, a traffic sign, a traffic light and/or the like.

In step 108, the road markings engine 220 may analyze one or more of the surfaces of one or more of the selected element(s) on which the driving assistance markings generated for the road segment are to be painted. In particular, the road markings engine 220 may analyze the image(s) of the road segment to identify a color of the surface(s) of the selected element(s) and more specifically to identify the spectral range of visible light reflected by the surface(s) of the selected element(s).

In step 110, the road markings engine 220 may select one or more paint materials for applying (painting) the enhanced driving assistance markings generated for the road segment on the selected element(s) of the road segment.

The computed driving assistance markings directed to support the automated vehicular system(s) are specifically directed to support such automated vehicular systems which are capable of operating in the infrared spectrum, in particular, automated vehicular systems which integrate, employ, connect and/or communicate with one or more of the imaging sensors adapted to operate in the infrared spectral range, for example, NIR, SWIR and/or the like.

The road markings engine 220 may select paint material(s) are highly transparent in one or more of the infrared spectral ranges, for example, NIR, SWIR and/or the like while reflecting light in the visible light range which does not significantly deviates from the light reflected by the surfaces(s) of the element(s) selected for painting the driving assistance markings. This means that in the visible light range, the selected paint material(s) should reflect light which deviates by less than a first value from the visible light spectral range reflected by the surface(s), for example, 10%, 15%, 20% and/or the like. However, in the infrared spectral range (e.g. NIR, SWIR), the selected paint material(s) may transfer more than a second value of light, for example, 80%, 85, %, 90%, 95% and/or the like.

For example, assuming one or more sections of the road segment are selected for painting the enhanced driving assistance markings. In such case, since the surface of the road segment may typically be black, the road markings engine 220 may select a certain paint material which reflects visible light in a spectral range significantly similar to the spectral range of black color such that the paint material does not deviate by more than the first value from the color of the road surface. However, the selected paint material(s) is characterized by transferring mote the second value of light in the infrared spectral range(s) such that markings presented beneath the selected paint material(s) are visible when in the infrared spectral range(s).

In another example, assuming the road markings engine 220 selects a certain traffic sign for painting the enhanced driving assistance markings specifically under (beneath) traditional and/or legacy driving assistance markings painted on the certain traffic sign, for example, a stop sign, an intersection ahead sign, a left curve sign and/or the like. Further assuming the certain traffic sign includes a white background and one or more red sections. In such case, assuming the enhanced driving assistance markings are to be presented beneath the red sections, the road markings engine 220 may select one or more paint materials which reflect light deviating by less than the first value form the light reflected by the red sections, i.e. paint material(s) which correspond to red color, for example, 600 nm. The certain paint material may be further selected by the road markings engine 220 to transfer more than the second value of light in one or more of the infrared spectral ranges, for example, NIR, SWIR and/or the like such that markings presented beneath the selected paint material(s) used to paint the red sections are visible when in the infrared spectral range(s).

In step 112, the road markings engine 220 may compute instructions for painting the enhanced driving assistance markings generated for the road segment on the selected element(s) underneath the sections painted using the selected paint material(s).

According to some embodiments, the enhanced driving assistance markings computed for the road segment may be painted under (beneath) the selected paint material(s). In such case, the road markings engine 220 may compute instructions for first painting the enhanced driving assistance markings on the surface(s) of the selected element(s) and may further compute instructions for painting the surface(s) using the selected paint material(s). Moreover, the instructions computed by the road markings engine 220 for painting the enhanced driving assistance markings may indicate using one or more first paint materials which are highly reflective and/or highly abortive in one or more of the infrared spectral range(s) thus making the enhanced driving assistance markings highly visible in the infrared spectral range(s) under the (second) semi-transparent paint material(s). The paint material(s) selected for painting the enhanced driving assistance markings may be highly reflective in the infrared spectral range in which the second paint material(s) transfers light such that while the second paint material(s) is transparent in this infrared spectral range, the enhanced driving assistance markings may be highly visible in this infrared spectral range.

For example, assuming the road markings engine 220 selects a certain traffic sign for painting the enhanced driving assistance markings, specifically one or more blue sections of the certain traffic sign. In such case, the road markings engine 220 may compute instructions for painting the enhanced driving assistance markings on the certain traffic sign at the location of the blue sections. The road markings engine 220 may further compute instructions for painting the blue sections with the selected paint material(s) characterized by reflecting light in the visible light range which deviates by less than the first value from the spectral range of the blue color while transferring more than the second value of light in the infrared spectral range(s). As such in the visible light range, the certain traffic sign may look as a legacy sign having the blue sections while in the infrared spectral range(s) the enhanced driving assistance markings painted beneath the blue sections are visible.

However, according to some embodiments, the enhanced driving assistance markings may be displayed by one or more display devices having a screen surface which is painted using the selected paint material(s).

For example, assuming the road markings engine 220 selects a certain traffic sign for presenting the enhanced driving assistance markings, specifically one or more displays may be mounted, coupled and/or attached to the traffic sign such that the display(s) form the traffic sign and/or part thereof. Further assuming the certain traffic sign contains white and blue sections. In such case, the road markings engine 220 may compute instructions for painting the white and blue sections with the selected paint materials characterized by reflecting light in the visible light range which deviates by less than the first value from the spectral range of the white and blue color respectively while transferring more than the second value of light in the infrared spectral range(s). As such in the visible light range, the certain traffic sign may look as a legacy sign having the blue sections while in the infrared spectral range(s) the content displayed on the display(s) beneath the white and blue sections may be visible.

Figure 10:
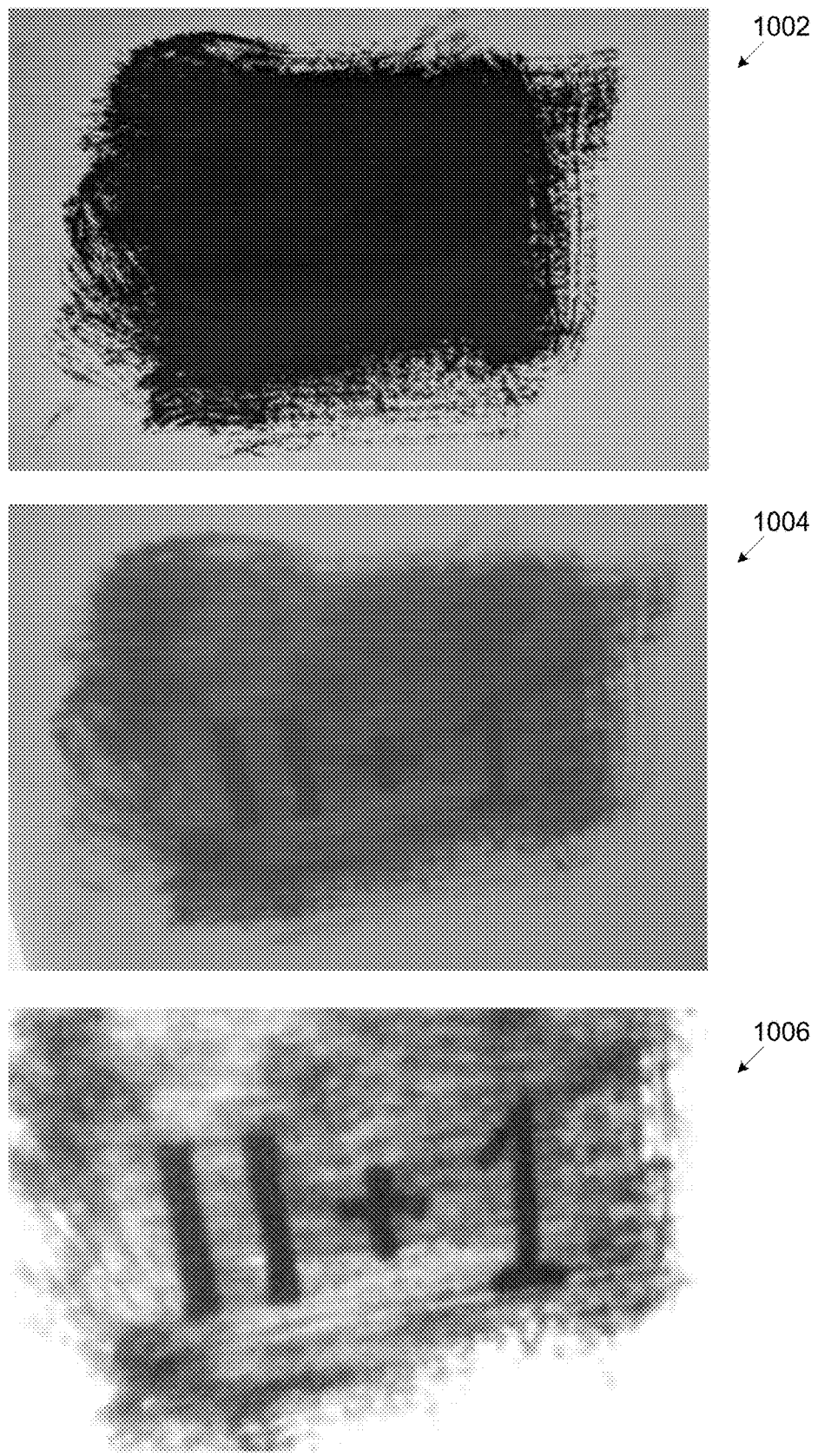
FIG. 10 presents images of exemplary markings printed beneath a paint material opaque in the visible light spectrum while transparent in infrared spectrum, according to some embodiments of the present invention.

In step 114, the road markings engine 220 may output the painting instructions computed for painting the driving assistance markings on one or more of the elements of the road segment using one or more of the infrared visible paint materials Reference is now made to FIG. 10, which presents images of exemplary markings printed beneath a paint material opaque in the visible light spectrum while transparent in infrared spectrum, according to some embodiments of the present invention.

A certain paint material opaque in the visible light spectrum while transparent in infrared spectrum may be selected to be painted over some experimental markings simulating the enhanced driving assistance markings. In particular, in the visible light spectral range, the certain paint material reflects light deviating by less than the first value from the light reflected by a black surface while in the infrared spectral range(s) the certain paint material transfers more than the second value of light.

As seen in image 1002 depicting a section painted with the certain paint material in the visible light spectral range, the certain paint material is opaque, specifically black. However, as seen in image 1004 depicting the painted section in the NIR spectral range, the markings painted under the certain paint material are visible. As seen in image 1006, one or more computer vision algorithms may be applied, for example, histogram stretching and/or the like to enhance the differentiation of the underneath markings from the surrounding background to improve their detectability.

Figure 11A:
FIG. 11A and FIG. 11B present images of exemplary markings printed on exemplary traffic signs beneath a paint material opaque in the visible light spectrum while transparent in infrared spectrum, according to some embodiments of the present invention.
Figure 11A:
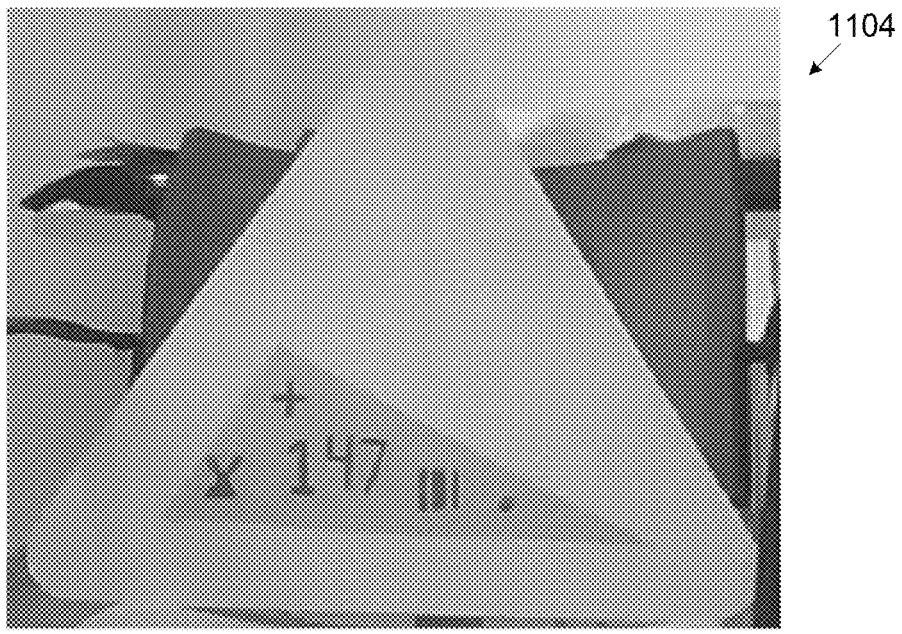
Figure 11B:
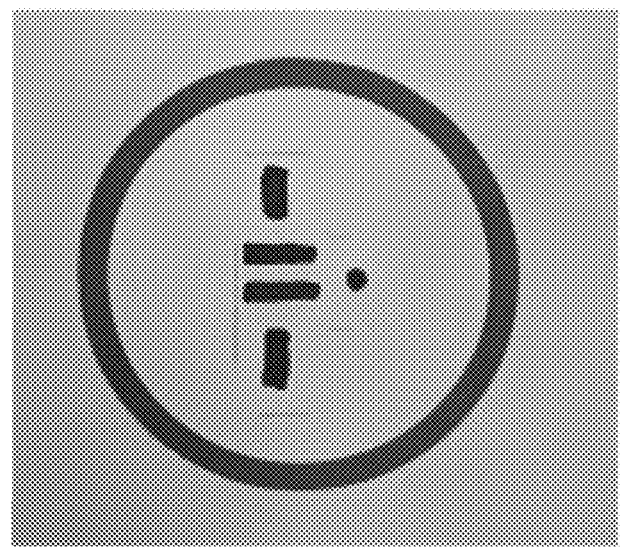
Figure 11B:
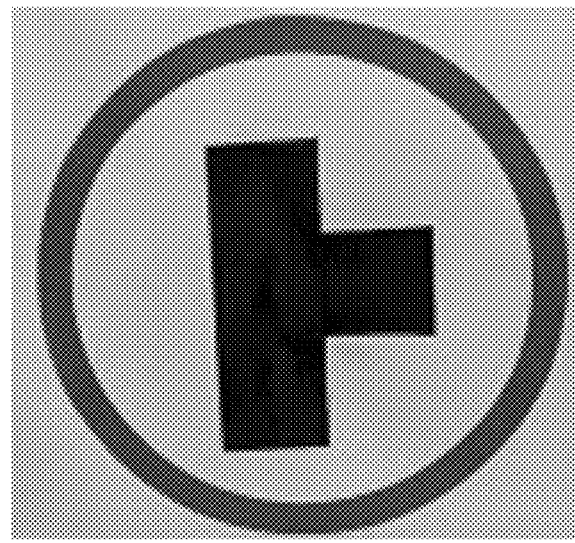
Figure 11B:
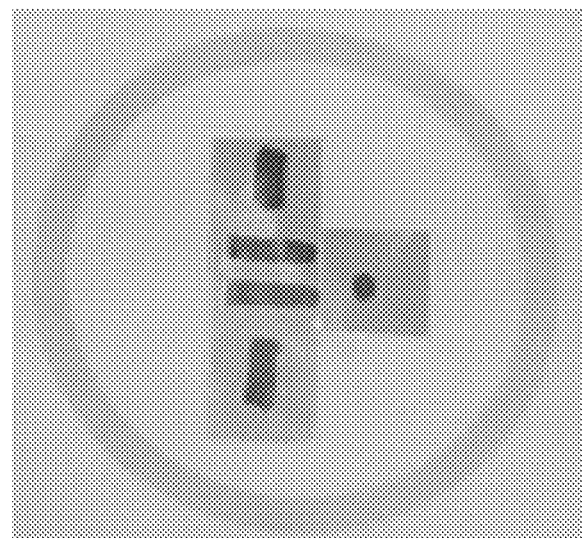

Reference is also made to FIG. 11A and FIG. 11B, which present images of exemplary markings printed on exemplary traffic signs beneath a paint material opaque in the visible light spectrum while transparent in infrared spectrum, according to some embodiments of the present invention.

A certain paint material opaque in the visible light spectrum while transparent in infrared spectrum may be selected for painting a certain traffic sign over some experimental markings simulating the enhanced driving assistance markings. In particular, the markings are painted under a trainable black section of the certain traffic sign.

An image 1102 depicts the certain traffic sign painted with the certain paint material in the visible light spectral range. As seen, since the certain paint material may be opaque, specifically reflecting light deviating by less than the first value from the surface, i.e. the black color surface, the markings printed under the certain paint material are imperceptible in the visible light spectrum and thus practically invisible. However, as seen in image 1104 depicting the certain traffic sign painted with the certain paint material in the NIR spectral range, the markings painted under the certain paint material are highly visible.

A second exemplary traffic sign portraying a rotated black plus sign may be also painted with exemplary markings covered with the certain paint material opaque in the visible light spectrum while transparent in infrared spectrum.

As seen in image 1112, the markings may be first painted on the second traffic sign, specifically in an area designated for the rotated plus sign. As seen in image 1114 depicting the second traffic sign painted with the certain paint material, since the certain paint material may be opaque, specifically reflecting light deviating by less than the first value from the traffic sign surface, i.e. the black color surface, the markings printed under the certain paint material are imperceptible in the visible light spectrum. However, as seen in image 1116 depicting the second traffic sign painted with the certain paint material in the NIR spectral range, the markings painted under the rotated plus sign painted using the certain paint material are highly visible.

According to some embodiments of the present invention, one or more automated vehicular systems such as the automated vehicular system 800 executing a road markings detector such as the road markings detector 820 may be configured to detect and identify the enhanced driving assistance markings presented under one or more paint materials which are opaque in the visible light spectrum in significantly transparent in the infrared spectral range(s).

As described in step 702 of the process 700, the road markings detector 820 may receive a plurality of images depicting the surrounding environment of a vehicle such as the vehicle 804, specifically a road segment in which the vehicle 804 is located. In particular, the received images may be captured by one or more imaging sensors such as the imaging sensor 802 adapted to operate in one or more of the infrared spectral ranges.

The received images may depict one or more elements located in the road segment, specifically element(s) painted with the enhanced driving assistance markings using one or more of the semi-transparent paint materials characterized by being opaque in the visible light range while highly transparent in one or more of the infrared spectral ranges. In particular, the paint material(s) may reflect light deviating by less than the first value from the visible light spectral range reflected by the surface(s) of the element while transferring more than the second value of light in the infrared spectral range(s).

As described in step 704 of the process 700, the road markings detector 820 may apply one or more of the analysis tools to analyze the images which are captured in the infrared spectral range(s) and identify the enhanced driving assistance markings and/or part thereof which may be visible in the infrared spectral range(s) underneath the paint material(s) covering at least part of the surface of the element(s). As described herein before, the enhanced driving assistance markings may be printed under the paint material(s) covering the surface(s) and/or the enhanced driving assistance markings may be presented by one or more display devices whose screen surface is painted with the semi-transparent paint material(s).

As described in step 710 of the process 700, the road markings detector 820 may output the enhanced driving assistance markings which may be used by one or more automated vehicular systems of the vehicle 804 to control and/or maneuver the vehicle 804, for example, break, accelerate, decelerate, turn and/or the like. While the road markings detector 820 may provide the detected driving assistance markings in visual form, typically the road markings detector 820 may output an indication of the detected driving assistance markings describing them in terms and/or format that is recognizable and decodable by the automated vehicular system(s). Moreover, the road markings detector 820 may output additional information relating to the detected driving assistance markings, for example, a location, a position, a direction, a distance, a confidence score of correct detection (i.e. a probability score) and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms infrared reflective, absorptive and/or semi-transparent paint materials are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of detecting driving markings visible in a plurality of light spectrums, comprising:
    using at least one processor deployed in a vehicle for:
        receiving a plurality of a plurality of images captured in a plurality of spectral ranges, the plurality of images depicting at least part of driving assistance markings painted on a surface of at least one element of at least one road segment with at least one paint material characterized by reflecting light deviating, in the plurality of spectral ranges, by more than a certain value from the light reflected by the surface;
        analyzing at least one first image of the plurality of images captured in a first spectral range of the plurality of spectral ranges to identify at least part of the driving assistance markings in the first spectral range;
        analyzing at least one second image of the plurality of images captured in at least one second spectral range of the plurality of spectral ranges to identify at least part of the driving assistance markings in the at least one second spectral range;
        identifying aggregated driving assistance markings by correlating between the at least part of the driving assistance markings identified in the first spectral range and the at least part of the driving assistance markings identified at least one second spectral range; and
        outputting the aggregated driving assistance markings.

2. The method of claim 1, wherein the analysis of the plurality of images to identify the aggregated driving assistance markings is based on segmentation by:
    applying at least one clustering algorithm to segment the at least one first image and the at least one second image,
    correlating respective segments in the segmented images to identify at least part of the driving assistance markings in the first spectral range and in the at least one second spectral ranges, and
    identifying the aggregated driving assistance markings according to the correlated segments.

3. The method of claim 1, wherein the analysis of the plurality of images to identify the aggregated driving assistance markings is based on edge detection by:
    applying at least one edge detection algorithm to the at least one first image to identify edges of at least part of the driving assistance markings in the first spectral range,
    applying the at least one edge detection algorithm to the at least one second image to identify edges of at least part of the driving assistance markings in the at least one second spectral range,
    correlating respective edges of at least part of the driving assistance markings identified in the first spectral range and in the at least one second spectral range, and
    identifying the aggregated driving assistance markings according to the correlated edges of the driving assistance markings.

4. The method of claim 1, wherein the plurality of spectral ranges are members of a group consisting of: visible light having a wavelength in a range of up to 700 nanometers, near infrared (NIR) having a wavelength in a range of 700-1000 nanometers and short wave infrared (SWIR) having a wavelength in a range of 1000-3000 nanometers.

5. The method of claim 1, wherein the certain value equals 15%.

6. The method of claim 1, wherein the driving assistance markings are directed to support at least one automatic vehicular system of at least one vehicle, the support comprises at least one of:
    providing the at least one automatic vehicular system information relating to at least one transportation infrastructure object located in the at least one road segment and/or in at least one subsequent road segment, and assisting the at least one automatic vehicular system to conduct at least one control operation of the at least one vehicle.

7. The method of claim 1, wherein the at least one element is a member of a group consisting of: a section of the at least one road segment, a colored mark printed on the at least one road segment and an infrastructure object located in proximity to the at least one road segment.

8. A system for detecting driving markings visible in a plurality of light spectrums, comprising:
at least one processor deployed in a vehicle configured to execute a code, the code comprising:
code instructions to receive a plurality of images captured in a plurality of spectral ranges, the plurality of images depicting at least part of driving assistance markings painted on at least one element of at least one road segment with at least one paint material characterized by reflecting light deviating, in the plurality of spectral ranges, by more than a certain value from the light reflected by a surface of the at least one element;
code instructions to analyze at least one first image of the plurality of images captured in a first spectral range of the plurality of spectral ranges to identify at least part of the driving assistance markings in of the first spectral range;
code instructions to analyze at least one second image of the plurality of images captured in at least one second spectral range of the plurality of spectral ranges to identify at least part of the driving assistance markings in of the at least one second spectral range;
code instructions to identify aggregated driving assistance markings by correlating between the at least part of the driving assistance markings identified in the first spectral range and at least part of the driving assistance markings in the at least one second spectral range; and
code instructions to output the aggregated driving assistance markings.

9. A method of painting enhanced driving assistance markings visible in infrared light spectrum, comprising:
using at least one processor for:
generating enhanced driving assistance markings expressing driving information relating to at least one road segment;
computing instructions for painting a surface of at least one element of the at least one road segment using at least one paint material characterized by (1) reflecting light in a visible light spectral range deviating less than a first value from the visible light spectral range reflected by the surface and (2) transferring more than a second value of light in at least one infrared spectral range such that the enhanced driving assistance markings presented under the at least one paint material are visible in the at least one infrared spectral range; and
outputting the painting instructions for applying the at least one paint material on the surface.

10. The method of claim 9, wherein the first value equals 15% and the second value equals 85%.

11. The method of claim 9, further comprising the enhanced driving assistance markings are encoded.

12. The method of claim 9, wherein the enhanced driving assistance markings are painted on the surface under the at least one paint material.

13. The method of claim 9, wherein the enhanced driving assistance markings are displayed by at least one display device having a screen surface painted with the at least one paint material.

14. The method of claim 9, wherein at least one automatic vehicular system is configured to identify the enhanced driving assistance markings by:
receiving at least one image captured in at least one infrared spectral range, the at least one image depicting the enhanced driving assistance markings painted on the at least one element under at least one paint material, and
analyzing the at least one image captured in the at least one infrared spectral range to identify the enhanced driving assistance markings painted under the at least one paint material.

\* \* \* \* \*